(12) United States Patent
Szepek et al.

(10) Patent No.: US 7,457,688 B2
(45) Date of Patent: Nov. 25, 2008

(54) METHOD AND SYSTEM FOR DETECTION AND TRANSFER TO ELECTRICAL ISLAND OPERATION

(75) Inventors: Scott William Szepek, Glenville, NY (US); John Michael Undrill, Scotia, NY (US); Michael Joseph Alexander, Simpsonville, SC (US); Warren James Mick, Altamont, NY (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 11/533,133

(22) Filed: Sep. 19, 2006

(65) Prior Publication Data

US 2008/0071427 A1 Mar. 20, 2008

(51) Int. Cl.
*F02C 9/00* (2006.01)

(52) U.S. Cl. .................... 700/287; 700/295; 60/39.281; 60/773

(58) Field of Classification Search ................. 700/287, 700/281, 292, 295; 60/39.27, 39.24, 39.281, 60/773, 793; 290/40 C, 52, 40 R; 307/43
See application file for complete search history.

(56) References Cited

U.S. PATENT DOCUMENTS

| 4,032,793 | A | * | 6/1977 | Uram | 290/40 C |
| 5,748,500 | A | * | 5/1998 | Quentin et al. | 702/182 |
| 6,095,793 | A | * | 8/2000 | Greeb | 60/39.822 |
| 6,164,057 | A | * | 12/2000 | Rowen et al. | 60/39.27 |
| 7,161,257 | B2 | * | 1/2007 | Lakov et al. | 290/40 R |
| 7,211,906 | B2 | * | 5/2007 | Teets et al. | 290/52 |

* cited by examiner

*Primary Examiner*—Albert DeCady
*Assistant Examiner*—Charles R Kasenge
(74) *Attorney, Agent, or Firm*—Nixon & Vanderhye P.C.

(57) ABSTRACT

A method for transient fuel control for fuel delivery circuits for a plurality of connected gas turbines, the method includes: detecting a transient grid event based on an indication of at least one of a rapid change in a fuel command to the gas turbine or an acceleration of the turbine shaft; upon detection of the transient grid event, commanding a gas turbine controller to transfer the gas turbine to at least one intermediate load; adjusting a fuel split to maintain combustor stability during the transient grid event, and using a predetermined island load demand signal to apportion an island load demand among the connected gas turbine generators.

22 Claims, 16 Drawing Sheets

METHOD AND SYSTEM FOR DETECTION AND TRANSFER TO ELECTRICAL ISLAND OPERATION

BACKGROUND OF THE INVENTION

This invention relates to electrical power generation for power utilities and particularly to "islanding" of power plant generators.

Island control typically refers to the transition from parallel grid operation to isolated operation, otherwise known as island mode, and subsequent steady state island mode operation. Typically island mode operation is used to support relatively small local "house" loads. Parallel grid operation is typical of supplying power to an external electrical load. The transition to island mode occurs as a result of severing the tie line circuit breakers coupling the generator to the external electrical load during which the turbine remains in operation to support the local plant electrical loads. During the transition to island mode, the control system responds to the tie line breaker opening and enables the island speed control governor to automatically maintain the system frequency per the island speed set point.

Gas turbine island mode operability typically involves two stages: grid separation stage and island governor control stage. During the grid separation stage, the gas turbine undergoes load rejection. The sudden loss of load on the generator can cause the gas turbine to dramatically accelerate to over speed conditions. To counter the shaft acceleration and over-speed the speed governor, e.g., droop governor, responds by rapidly reducing fuel to limit the acceleration and avoid over speeding the gas turbine generator. The rapid reduction in fuel from the speed governor response imposes turbine operability restrictions during the grid separation stage. During the next stage, the island governor assumes control and regulates frequency to the island speed setpoint.

Power plants are often required to provide uninterrupted power generation after an unexpected disconnection from the electrical grid to support local electrical loads during the transient grid separation and beyond. The difference ("net load imbalance") between local plant electrical load demand and the amount of power exported to the electric grid just prior to electrical grid separation dictates the electrical transient and gas turbine generator response during the grid separation stage. If the net load imbalance is large, the resultant gas turbine generator speed and acceleration response can be substantial. The resultant gas turbine generator response can determine the ability to support the local plant electrical load during the grid separation stage.

Conventionally, the same droop governor that regulates the gas turbine while operating parallel with the electrical grid is used to transition the gas turbine to island mode. A droop governor adjusts the fuel command of the gas turbine which drives the generator to maintain a desired frequency for the electrical grid. When disconnected from the grid, the droop governor responds to changes in the island frequency that occur as a result of the changes in the local load. The load and frequency changes that occur during the transition from grid to island mode operation may be quick and large. During this transition, the droop governor may not be able to fully respond to the changes. Further, the droop governor may not restore the generator frequency during island mode to a nominal frequency. Additional functionality, such as a preset and trim algorithm, have been added to a conventional droop governor to allow for correction and restoration of nominal frequency while in island governor control.

Upon grid separation, the gas turbine fuel governor reacts to the resulting shaft acceleration by rapidly reducing fuel to the combustors. The acceleration increases the airflow to the gas turbine. The fuel cutback coupled with the change in gas turbine airflow results in a transient combustor fuel/air mixture that may exceed the gas turbine Dry Low NOx operability design specification.

The traditional method to manage such transients has been to transition to a robust combustion operating mode which can support the rapid fuel and air changes during the transient. This conventional method limits the maximum power island load demand during the transient and requires, in some cases, significant load shedding locally within the plant. Alternatively, careful management of the gas turbine operation prior to the grid separation has been applied where plant operations limit plant export power thereby limiting the net load imbalance at the moment of grid disconnect. This conventional method can limit the maximum load attainable by the gas turbine generator during normal operation.

There is a long felt need for a gas turbine control system that provides improved island mode operation and transition to island mode. Further, there is also a long felt need for a control system that is not subject to some or all of the limitations of conventional control systems, such as those described above.

BRIEF DESCRIPTION OF THE INVENTION

A method has been developed to supply transient fuel control for fuel delivery circuits for a plurality of connected gas turbines, the method includes: detecting a transient grid event based on an indication of at least one of a rapid change in a fuel command to the gas turbine and an acceleration of the turbine shaft; upon indication of the transient grid event, commanding a gas turbine controller to transfer the gas turbine to at least one intermediate load; adjusting a fuel split to maintain combustor stability during the transient grid event, and using a predetermined island load demand signal to apportion the total plant island load demand among the connected gas turbine generators.

A further method has been developed to supply transient fuel control for fuel delivery circuits for a plurality of connected gas turbines, the method comprises: detecting a transient grid event based on an indication of at least one of a rapid change in a fuel command to the gas turbine or an acceleration of the turbine shaft; accelerating the gas turbine as a result of the transient grid event; upon indication of the transient grid event, commanding a gas turbine controller to transfer the gas turbine to at least one intermediate load; adjusting a combustor fuel split to maintain combustor stability during the transient grid event, and using a predetermined island load demand signal to apportion the total plant island load demand among the connected gas turbine generators.

A fuel control system has been developed for fuel delivery circuits for a plurality of connected gas turbines, said system comprises: a gas turbine including a combustor and a controller; a detection system monitoring a condition of a power grid and sensing a grid transient event; said controller including a computer executing a transient fuel control algorithm upon receiving a signal form the detector indicating the grid transient event, wherein said algorithm performs the following steps: generates a control signal to transfer at least one of the gas turbines to an intermediate load; adjusts a combustor fuel split to maintain combustor stability during the transient grid event, and apportions an island load demand among the connected gas turbine generators based on a predetermined island load demand signal.

DETAILED DESCRIPTION OF THE INVENTION

A method and system are disclosed for detection of a power grid separation and transfer to island mode operation. When grid separation is detected, the method and system control a group of connected gas turbines during the transient grid separation to maintain gas turbine generator operability. The transient fuel control method and system enhance gas turbine operability. The system may be implemented on a conventional gas turbine controller, which may include a droop governor. The system generally involves added software control algorithms.

Figure 1:
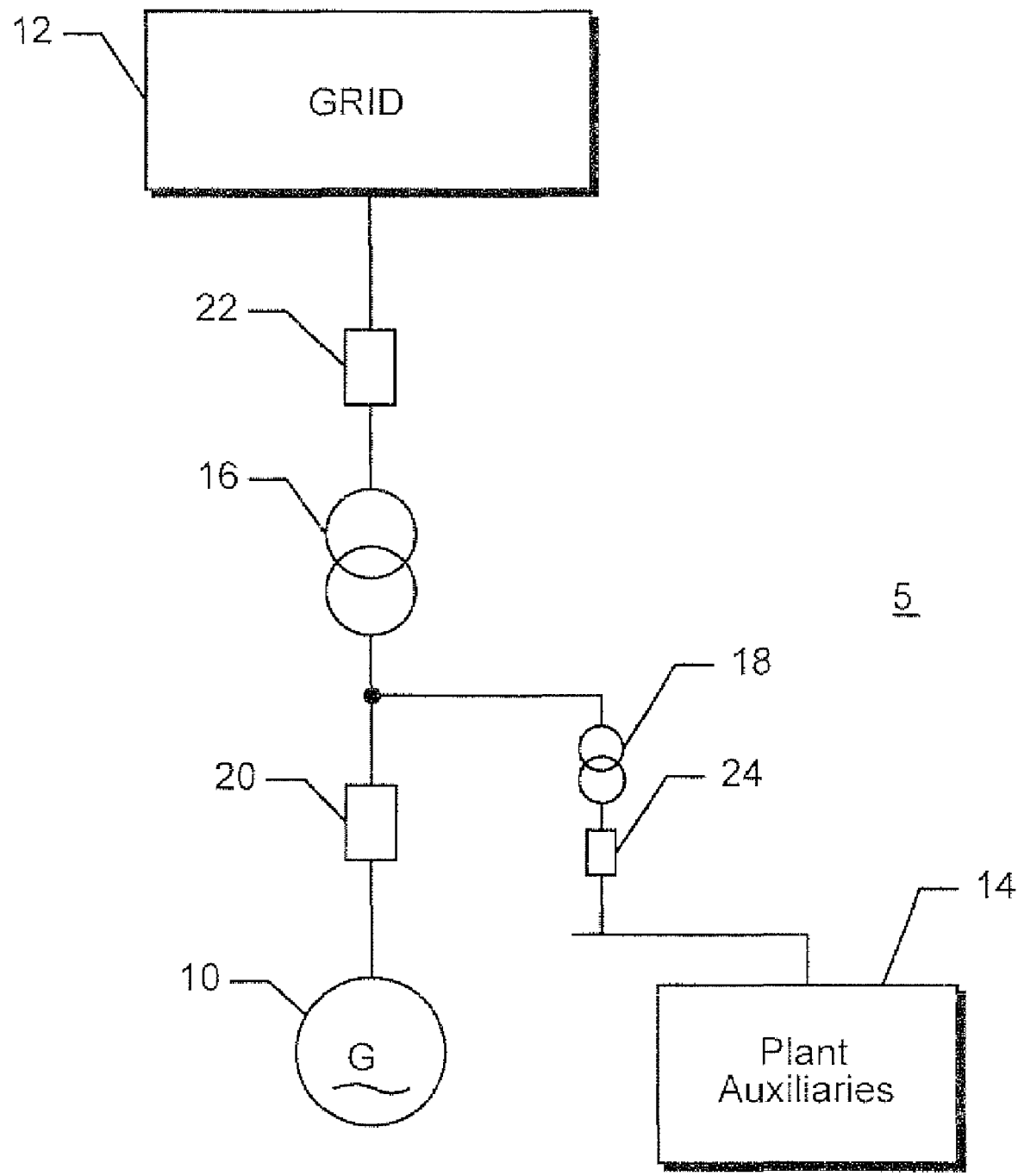
FIG. 1 is a schematic diagram of an electrical power generation and load system including a gas turbine generator.

FIG. 1 is a schematic diagram of an electrical power generation and load system 5 including a gas turbine generator(s) 10 that can be connected to a power utility grid 12 and to a local power load (plant auxiliaries) 14, such as a manufacturing plant onsite with the generator. A single line is shown in FIG. 1 for the multi-phase power lines that connect the generator to the grid and power load. The plant may include plant auxiliaries 14 that support plant operations for the connected gas turbine generators 10. Transformers convert the output voltage of the generator to a desired input voltage for the plant auxiliaries and the grid.

Circuit breakers establish connections between the generator 10 and the grid 12 and the generator and the local plant auxiliaries 14. A generator circuit breaker 20 couples the generator 10 to the transformers 16 and 18, a tie line circuit breaker 22 couples the step-up transformer 16 to the grid 12 and a third auxiliary circuit breaker 24 couples the auxiliary transformer 18 to the local plant auxiliary loads 14.

"Islanding" or island mode occurs when the output power from the generator 10 is isolated from the electric grid. In island mode, the tie line circuit breaker 22 is opened, and the generator circuit breaker 20 and the local plant auxiliary load breaker 24 remain closed. During islanding, the gas turbine generator 10 may provide power solely for the local plant load 14 flow via the unit auxiliary transformer 18.

While supplying power to the power grid, gas turbines typically utilize a droop governor to maintain a desired electrical frequency of the generator output power. When the generator 10 is providing power to a power grid 12, a drop in electrical frequency generally indicates that the power generation capability supplying the grid 12 is less than the load demand on the grid. Conversely, if the frequency of the power in the grid 12 is above the nominal frequency, the power generation capability being supplied to the grid is greater than the load demanded.

The droop governor accommodates variations in the frequency in the grid by changing the power output of a turbine inversely proportional to the difference in the electrical grid frequency from the nominal grid frequency, e.g., rated grid frequency. For example, if the grid frequency drops below a nominal grid frequency, the droop governor detects the grid frequency drop and commands the turbine to increase its power output in inverse proportion to the difference between the rated grid frequency and actual grid frequency. Conversely, if the grid frequency increases above the rated frequency, the drop governor detects the difference in actual and nominal grid frequencies and commands the turbine generator to reduce power output proportionally.

The droop response of a gas turbine generator governor is typically referred to in terms of the percent frequency variation required to cause a 100% turbine load output change. For example, a 4% droop response means that the gas turbine load output will change by 100% with a 4% grid frequency change. In other words, a 4% droop governor will modify the gas turbine output by 25% per every 1% grid frequency change. Grid frequency and turbine speed are proportionally related. With a 4% droop response, every 1% change in turbine shaft speed changes the generator output power by 25%.

Figure 2:
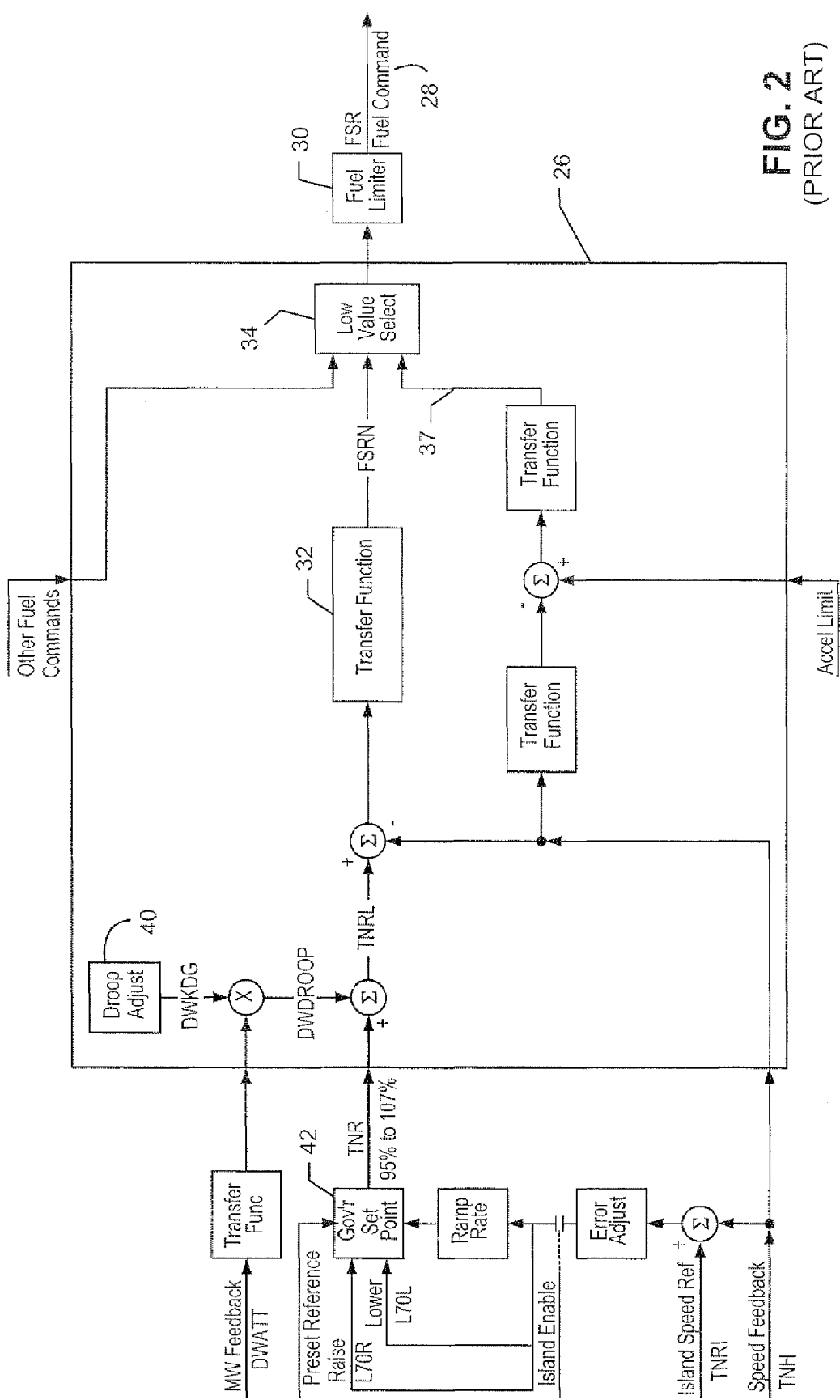
FIG. 2 is a flow chart for functional diagram showing a conventional operation of a droop governor adapted for island mode operation.

FIG. 2 depicts the conventional droop control and additional automated frequency correction algorithms utilized in island governor control. Conventionally, the same droop governor 26 that regulates the gas turbine while operating in parallel with the electrical power grid is also used to transition the gas turbine to island mode. A droop governor adjusts the fuel command of the gas turbine which drives the generator to maintain a desired frequency for the electrical grid. When disconnected from the grid, the droop governor responds to changes in the island frequency that occur as a result of the changes in the local plant load. The load and frequency changes that occur during the transition from grid to island mode operation may be quick and large. During this transition, the droop governor may not be able to fully respond to the changes. Further, the droop governor may not restore the generator frequency during island mode to a nominal frequency. Additional functionality, such as a preset and trim algorithm, have been added to a conventional droop governor to allow for correction and restoration of nominal frequency while in island governor control.

FIG. 2 depicts a conventional droop governor with additional automated frequency correction algorithm utilized in island governor control. The droop governor 26 is a computer controller for generating a fuel command 28 that is converted by a fuel limiter 30 to a fuel command (FSR) applied to the fuel controller (not shown) for the combustor. The governor includes a transfer function 32 that generates a speed control fuel command (FSRN) signal that is low value selected 34 with the acceleration fuel control limit 37 and other fuel commands within the controller.

During grid operation, a power feedback signal (MW Feedback MWATT) signal is passed through a transfer function and adjusted, e.g., multiplied, by a droop adjust factor 40. A difference between the resulting DWDROOP signal and the speed/load control command signal (TNR) is applied as the control command load reference signal (TNRL). The difference between the TNRL signal and the actual speed signal (THN) is applied to the transfer function 32 to generate the speed control fuel command signal (FSRN).

Once island control is enabled (Island Enable), the difference in a speed reference (TNRI) and shaft feedback speed (TNH) signal is processed by an error adjust operation and is converted by a ramp rate conversion to generate an input signal applied to a governor set point function 42. The input signal triggers the automatic governor setpoint operation to raise and lower the speed/load reference control command signal (TNR). Thus, TNR is raised and lowered to match the speed set point.

In island governor control mode, the gas turbine speed/load governor, e.g., droop governor, is specifically used for speed control. In contrast, the speed/load governor is used for load control when the gas turbine is coupled to a grid. While running in island mode the gas turbine droop governor 26 controls fuel to oppose the island speed error, which is the difference between an island speed set point and system frequency. If the speed set point is not identical to the system frequency, the droop governor will adjust the fuel control signals to a maximum or minimum value in an attempt to diminish the speed error. Conventionally, a gas turbine under island governor control should not be loaded above 90% capability to provide an adequate margin if needed to respond to drop in island frequency. If additional capability is required, other power generation equipment should be brought on to support the isolated power island under droop governor control.

Gas turbines equipped with Dry Low NOx (DLN) combustion systems typically utilize a fuel delivery system that includes multi-nozzle, premixed combustors. The requirements for DLN fuel delivery systems typically limit the ability of the controller to adjust fuel to the combustors in response to a rapidly changing load. DLN systems present a challenge to the local plant requirements to support high power load demands during a grid separation transient. Industrial gas turbines frequently employ lean premixed combustor designs to achieve low NOx emissions without using diluents such as water or steam. Lean premixed combustion involves premixing the fuel and air upstream of the combustor flame zone and operation near the lean flammability limit of the fuel to keep peak flame temperatures and so also NOx production, low. Lean premixed combustor designs are often referred to as dry low NOx combustors (DLN). To deal with the stability issues inherent in lean premixed combustion and the wide fuel-to-air ratio range that occurs across the gas turbine operating range, DLN combustors typically have multiple fuel nozzles in each combustion chamber that are fueled individually or in sub-groups. The gas turbine fuel system has a separately controlled circuit to supply each group of nozzles in each chamber. The control system will vary the fuel flow (fuel split) to each circuit over the turbine operating range to maintain flame stability, low emissions, and acceptable combustor life.

Figure 3:
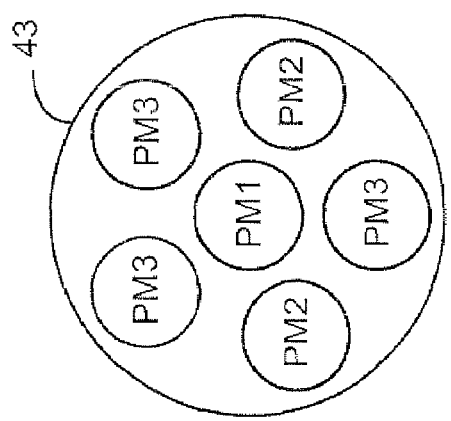
FIGS. 3 and 4 are schematic diagrams illustrating conventional fuel nozzle groups and conventional fuel circuit arrangement for a gas turbine with a dry low nitrous oxide (DLN) combustor.
Figure 4:
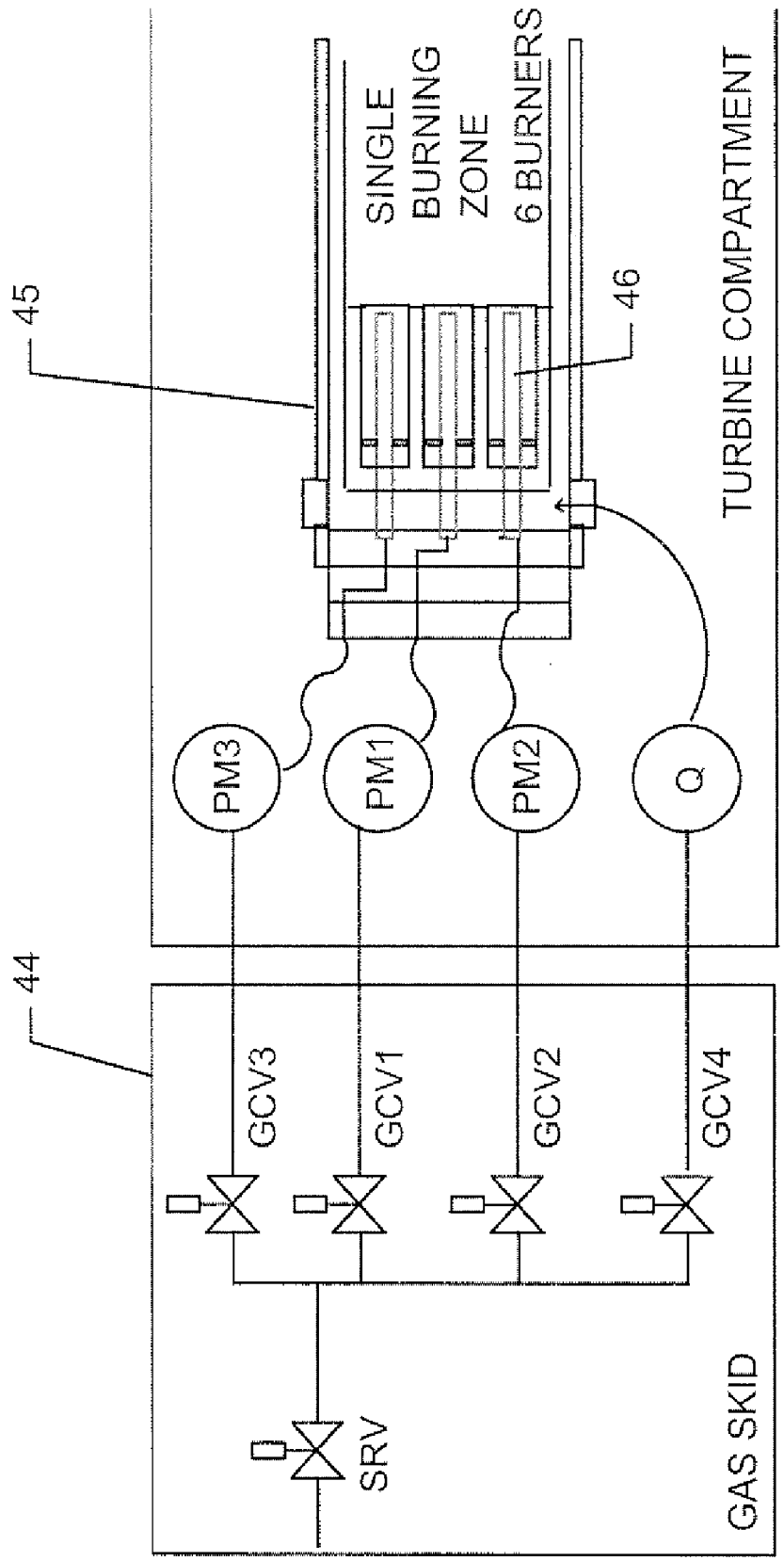

FIGS. 3 and 4 are schematic diagrams illustrating fuel nozzle groups 43 and fuel circuit arrangement 44 for a gas turbine with a DLN combustor 45. A DLN combustor can have six fuel nozzles 46 arranged into three nozzle groups PM1, PM2 and PM3. The fuel circuit that feeds each group is referred in a similar designation, e.g., the PM1 circuit supplies the PM1 nozzles. The fuel circuits may include a speed/ratio valve (SRV), gas control valves (GCV_) for each nozzle group, and a gas control valve (GCV4) for the quaternary manifold (Q), casing and pre-mix manifolds. The fuel circuits may be turned on and off over different portions of the turbine operating range. A combustion mode is used to designate when a particular set of fuel circuits is active, e.g., supplied with fuel.

Figure 5:
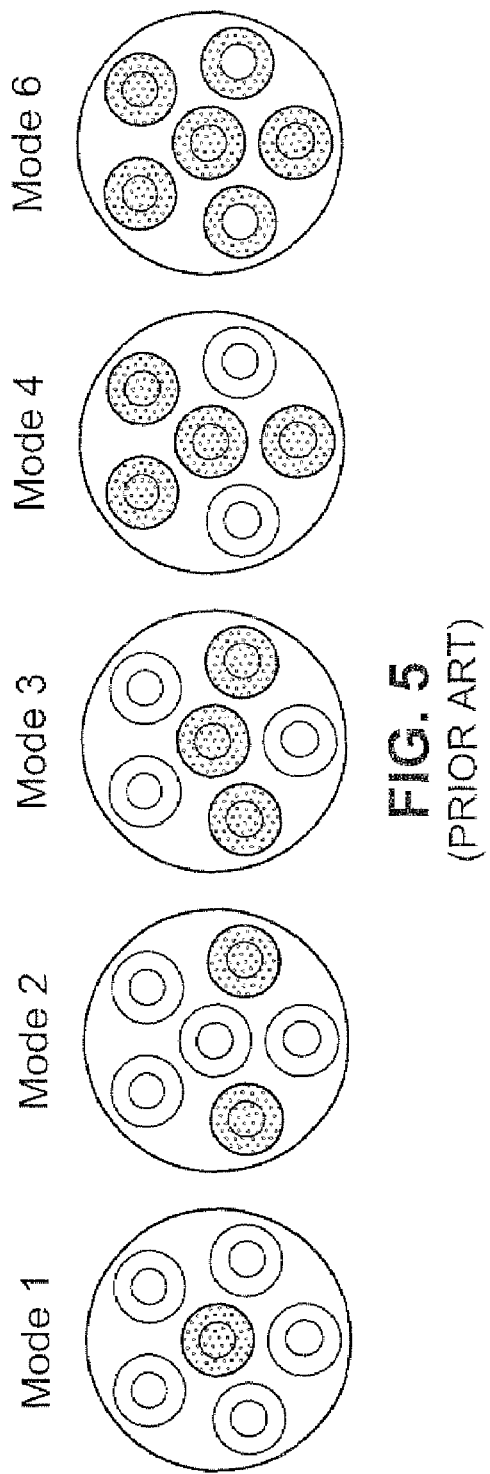
FIG. 5 shows the mode designations for an exemplarily conventional DLN combustor for an industrial gas turbine.
Figure 6:
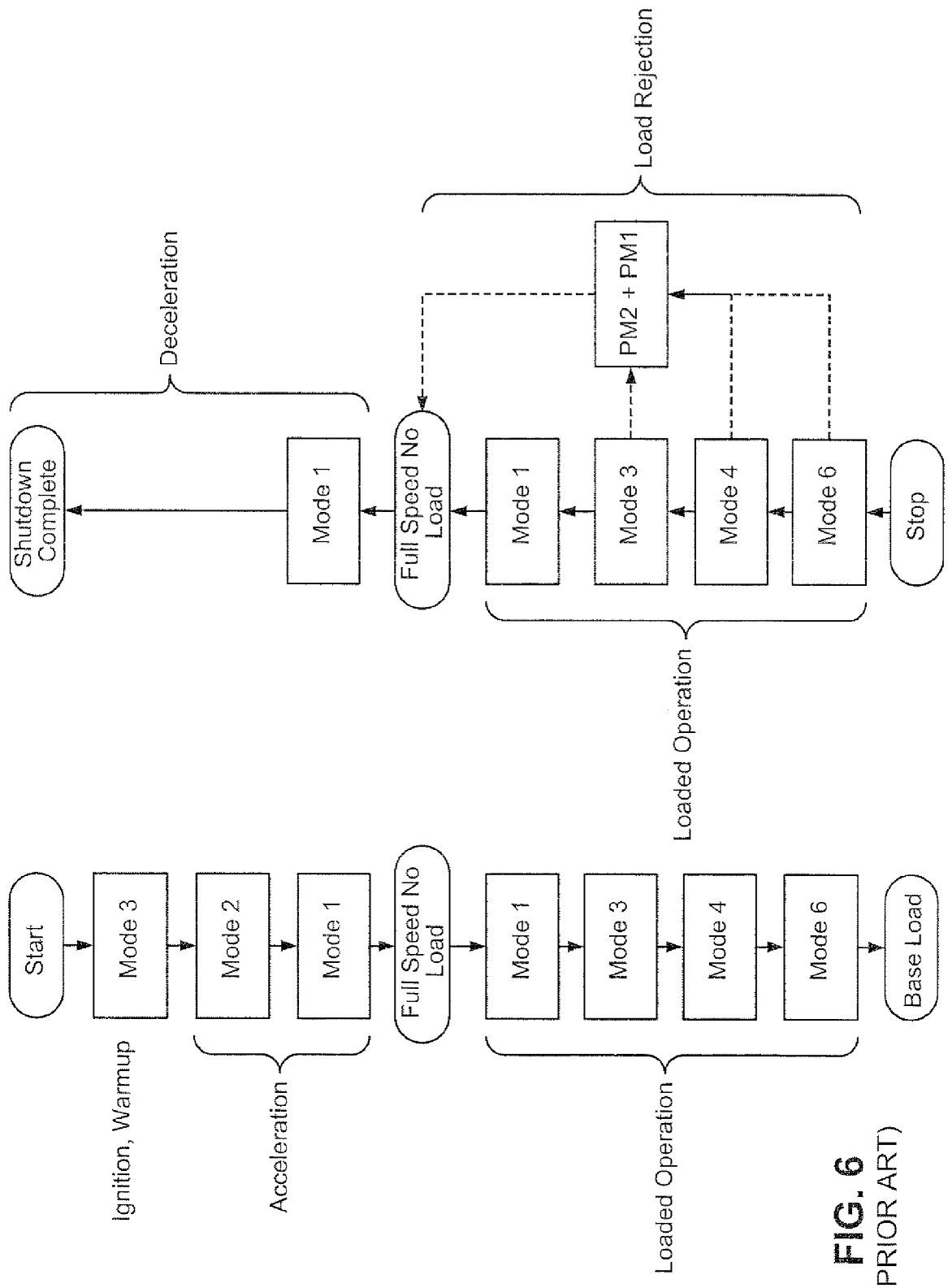
FIG. 6 shows a mode sequence for transitioning the DLN combustor from ignition to full load as well as from full load to shutdown.

FIG. 5 shows the mode designations for an exemplarily conventional DLN combustor 45 for an industrial gas turbine. FIG. 6 shows a conventional mode sequence for transitioning the DLN combustor from ignition to full load as well as from full load to shutdown. For each operating mode, one of the active fuel circuits is usually designated as the anchor circuit. The anchor circuit is preferentially fueled to maintain adequate flame blow out margin over the range of that particular mode. The robust flames at the nozzles fed by the anchor circuit will assure overall combustor stability by piloting the remaining fueled nozzles in the chamber, which can be run at much leaner levels. Even with the mode and anchor circuit strategies employed on many DLN combustor designs, large gas turbine load transients still present a challenge to the gas turbine fuel control system with respect to maintaining flame stability.

The traditional method to manage large transients has been to transition to a robust combustion operating mode which can support the rapid fuel and air changes during the transient. This conventional method limits the maximum power island load demand during the transient and requires, in some cases, significant load shedding locally within the plant If the expected power demand for island mode exceeds the maximum load attainable using the traditional method, alternate methods are needed to improve gas turbine combustor stability during the grid separation/load rejection stage. These alternate methods should support higher plant island loads during the grid separation transient and during island mode operation. A novel transient fuel control algorithm is needed that allows partial load rejections during the transition to island mode where the initial plant island load demand exceeds standard island load rejection maximum limits. The transient fuel control algorithm should require no additional operational restrictions that might limit the output of the gas turbine generator during normal operation, e.g., non-island mode.

The novel method and system disclosed herein provide an integrated solution to grid separation and island mode operation at elevated plant island loads. The method and system are suitable for heavy-duty gas turbines that generate electrical power. The method and system may be invoked to control gas turbine generators in response to unplanned transfers to island mode.

A strategy for managing the gas turbine fuel system has been developed to maintain gas turbine operability during a grid separation and transition to islanded operation without impacting normal gas turbine generator operation.

The transient fuel control algorithm may include three main elements, which are:

(A) Transient Detection: Transient mode is initiated after detection of a transient grid event by way of either a rapid change in fuel command or acceleration of the turbine shaft. Upon detection of the transient grid event, the transient fuel control algorithm is activated. The detection algorithm is used in conjunction with the island mode load split and the island combustion mode selection algorithm to command the transfer of the gas turbine to intermediate load operation during a grid separation.

(B) Transient fuel control and combustion mode selection: The transient fuel control algorithm adjusts the combustor fuel splits and mode-to-mode transition points to maintain specified combustor stability during the transient grid event. Since the turbine parameters that normally govern mode transitions and fuel splits may not respond quick enough during a large transient, other faster parameters will be used to preemptively bias the mode transitions and fuel splits if a large transient is detected. For example, the transient fuel control algorithm will elevate the fuel to one circuit (the anchor circuit) to increase the combustor blow out margin during the transition to island governor control.

(C) Island Load Assignment: The customer supplied island load demand signal is processed in a load assignment algorithm that automatically apportions the total island load demand among the connected gas turbine generators. The apportioned load demand is used in selecting an appropriate destination DLN combustion mode throughout the transient and is used to pre-position the gas turbine speed/load reference command (TNR).

Figure 7:
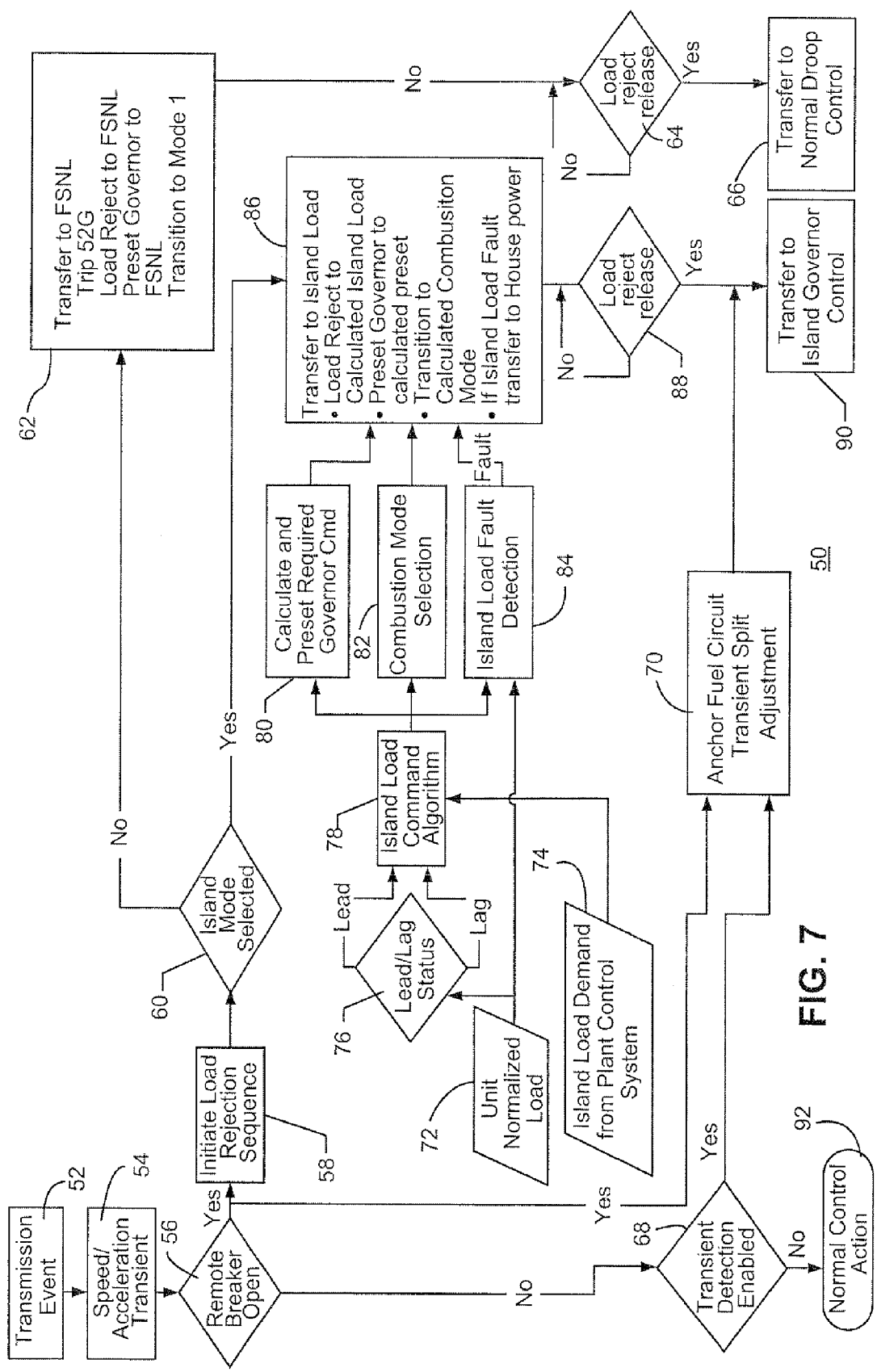
FIG. 7 depicts a novel island control function used to transition a plurality of units to island mode.

FIG. 7 depicts an exemplary general sequence flow 50 of the transient fuel control algorithm. The algorithm mitigates the risks of inadvertent loss of electric power generation during unplanned grid separation events through timely detection of electrical transients, reaction to the transient, and fuel management following the electrical transient. Additionally, the algorithm improves gas turbine operability where a power transmission system event affects the gas turbine generator while the plant is still connected to the grid. The transient fuel control algorithm detects and responds to the event regardless of the grid connection status and redistributes fuel to the gas turbine(s) such that the combustor robustness is improved. After re-stabilization, the control algorithm restores nominal settings and fuel distribution to re-establish steady state operation.

Additional measures are incorporated in the transient fuel control algorithm 50 to provide "remote detection" of a breaker in the event that tie line detection fails. Remote detection is tuned to respond when grid separation is indicated based on the monitoring of physical machine speed, shaft acceleration or both. Remote detection triggers the fuel system response to provide a secondary means to detect islanding. Remote detection may include an accelerometer or velocimeter that monitors the shaft of the gas turbine.

The sequence 50 may be initiated by a transmission system event, such as a rapid loss of the grid load in step 52 which may cause a speed/acceleration transient in step 54. During the transmission system event, the controller determines 56 whether the remote tie line circuit breaker 22 has switched. If the remote tie line breaker has changed position (Yes), the controller initiates the load rejection sequence 58 and then determines whether island control mode has been selected 60. If not, a normal load rejection sequence to FSNL is enabled 62, the combustors are operated in load rejection mode, e.g., mode l and the fuel is transferred, e.g., reduced, to sustain the gas turbine at full speed no load (FSNL). Once load rejection mode is released 64 the unit transfers to normal droop control 66.

If in step 56, the tie line breakers have not been switched (No) when a transmission system event occurs (which indicates that the generator output remains connected to the power grid), the gas turbine may accelerate and thereby cause the generator frequency and/or power to change. If the speed and acceleration change is significant, the transient detection enable 68 will trigger. If the remote tie line breaker has changed position 56 (Yes) or the transient detection enable triggers (Yes), the Anchor Fuel Circuit Transient Split Adjustment 70 applies a split adjustment to the nominal on-line schedule.

Figure 9:
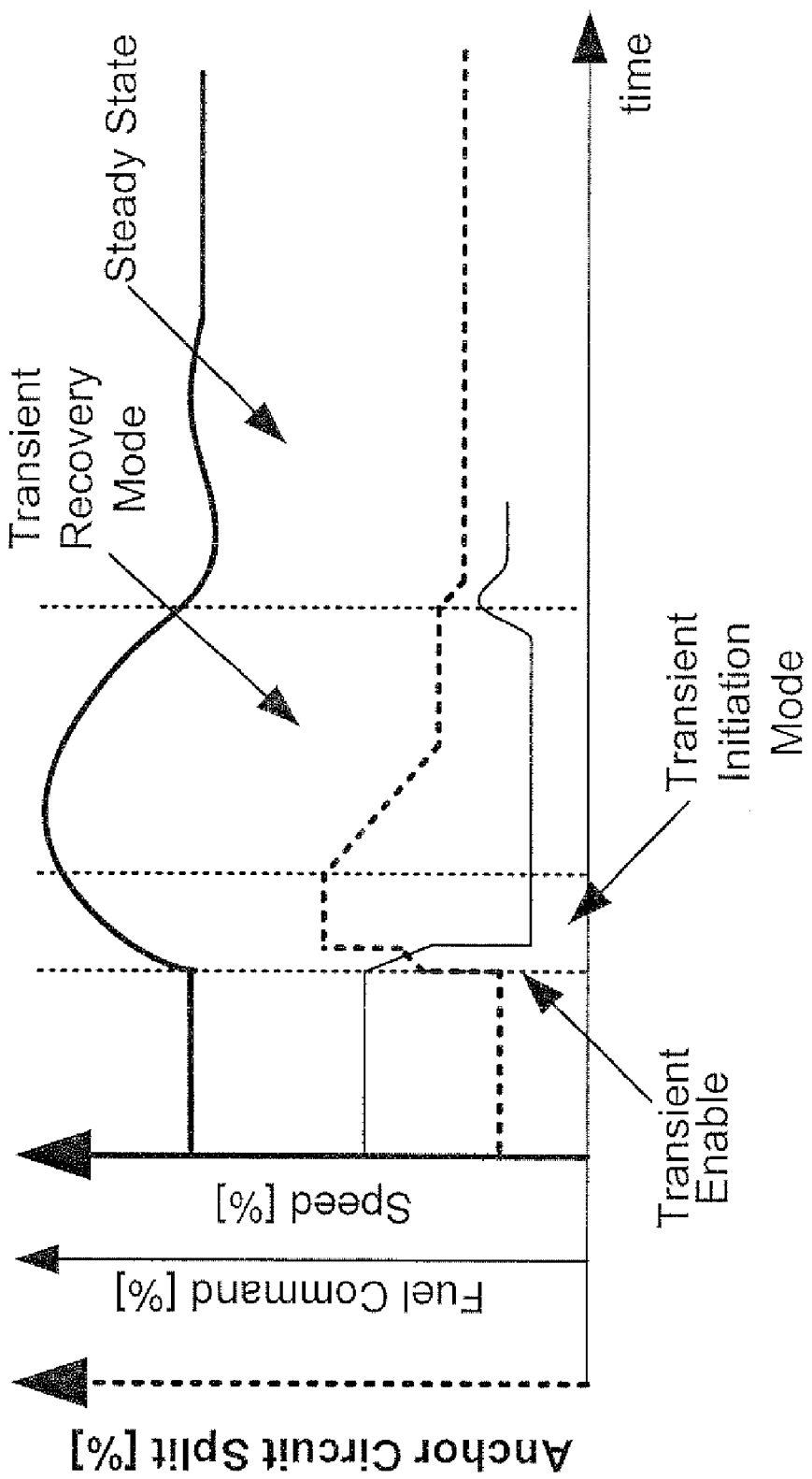
FIG. 9 depicts a novel anchor fuel circuit split adjustment algorithm used to enhance combustor performance during large transients.

FIG. 9 describes the anchor circuit fuel split adjustment 70. The anchor fuel circuit fuel split (dotted line) is adjusted to help maintain combustor stability during the transient. During transient initiation mode the anchor circuit fuel split is adjusted from its pre-event nominal split such that during the initial load rejection transient the anchor circuit fuel flow is equal or greater than the pre-event fuel flow. Once the controller determines that transient initiation is complete the anchor circuit fuel split is allowed to ramp back to nominal split plus an offset during transient recovery mode. Finally, the anchor fuel split is ramped back to nominal split setting as the transient bias is removed once the controller determines the transient period is complete and the machine has stabilized at steady state.

A transient fuel control split adjustment manages fuel distribution to the combustion fuel circuits during large rapid transients. The split adjustment may differ from the on line schedule as it is commanded independent of typical scheduling inputs in consideration of the magnitude of the disturbance. This is necessary because the typical fuel split algorithms are delayed due to transient behavior and heat release from the gas path components during the transient.

During all operating conditions the controller calculates an applicable pre-armed destination governor setpoint 80 (FIG. 7) and combustion mode 82 which is utilized when in sequence 50. The controller executes the transfer to island load 86 and load rejects to the calculated destination load and combustion mode when isolated from the grid (step 56, Yes). The transfer to island load 86 utilizes the pre-armed island load command algorithm 78. The island load command algorithm uses as inputs the lead/lag unit status 76 and island load demand signal from the plant control system 74. The lead/lag unit status 76 is determined by an active calculation of the unit normalized load 72 which normalizes a filtered unit MWATT output signal using ambient conditions as a normalization parameter. Lead unit status is generally given to the connected generator with the highest output. The island load demand from the plant control system along with the unit lead/lag status is then processed in the Island Load Command algorithm depicted in FIG. 8. Once load rejection mode is released 88 and the anchor fuel circuit transient split adjustment 70 is complete the unit transfers to island governor control 90.

When multiple generation capability is present on a single electrical system it is necessary to declare a Lead turbine and a Lag turbine, step 76. As mentioned earlier, the lead unit status is generally given to the connected generator with the highest output. The lead turbine will dictate among the connected units the load split during the load rejection stage. The lead gas turbine will calculate the initial percentage of total plant island load it will carry during the initial load rejection stage. The lag turbine is then commanded to load reject to the remaining plant island load not carried by the lead gas turbine. Thus, if the lead turbine load command is equal to the entire plant load demand the lag turbine is commanded to trip to FSNL. Additional measures are made to ensure the lead and lag gas turbines have sufficient capacity to handle the transition to their respective load commands. If the either the lead or lag gas turbine is commanded to exceed its capability the island load fault detection 84 will trigger a transfer to house power. This control of the lead/lag turbines helps ensure that the control of multiple gas turbines does not initiate oscillations due to the presence of independent speed detection on each generating turbine. Without a lead and lag status and if each governor for each turbine reacts to what it detects, system dynamics presents the opportunity for turbines to respond to each other's reactions to a detected event, therefore setting up oscillations.

Figure 8:
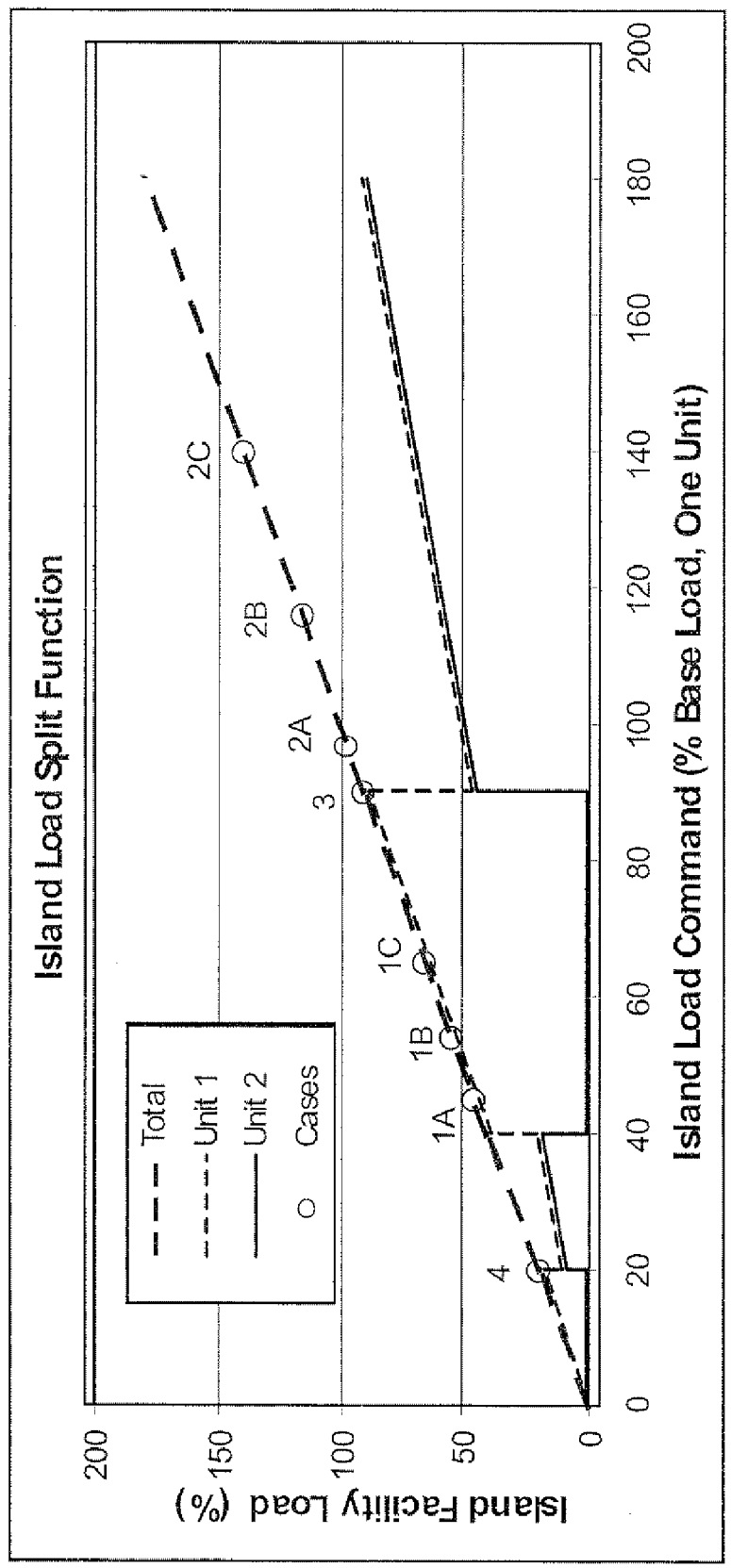
FIG. 8 is a chart of a novel load split technique to transfer a plurality of units to island mode.

FIG. 8 is an exemplary novel control algorithm for managing island load for two gas turbines (unit 1 and unit 2) during island mode operation. The algorithm shown in FIG. 9 is an island load split function. The algorithm splits the island load demand amongst two connected gas turbines according to a predefined schedule to help manage the combustion transient seen on each gas turbine during the load rejection stage. The load split function also serves to prevent the connected gas turbines from attempting to load above 90% capability so that adequate frequency response margin is maintained. The algorithm determines the preferred gas turbine island load split for each unit depending on the island load level (in percentage of total island facility load). FIG. 9 depicts a preferred load assignment of multiple gas turbines in consideration of optimal operation during a load rejection to high island load. The figure is utilized to divide the predetermined island load between the gas turbines in the most robust manner in consideration of target DLN operating mode and combustion system capability. The cases identified in the table are described below in connection with Table 2 and FIGS. 10 to 33.

While FIG. 8 depicts a two gas turbine unit system, the algorithm can be developed for more than a two gas turbine unit system, using the disclosure herein and ordinary skill in industrial gas turbine power loading arts.

A test was performed using a General Electric (GE) gas turbine Mark VI engine control software in real time integrated simulation using the transient fuel control algorithm described above in connection with FIGS. 7 and 8, as implemented in the control system for a GE Model 7FA+e industrial gas turbine generator. Simulations cases were run to demonstrate the capabilities and limitations of the transient fuel control algorithm to respond to grid separation and to tune the control algorithms for island mode. The islanding simulation was used to verify the capabilities over a range of island loads and ambient conditions. These conditions are summarized in the Table 1.

TABLE 1

Islanding Requirements

| Facility Load Range | Ambient Temp Range |
|---|---|
| 180 to 265 MW | 30° F.-120° F. |
| 85 to 140 MW | 30° F.-120° F. |

The simulation cases demonstrate the islanding function at several key conditions that represent design conditions. These cases are listed in the Table 2.

TABLE 2

Simulation Cases

| Case | Island Load [MWATT] | Amb Temp [F.] | Facility Load [%] | Unit 1 Dest Cond | Unit2 Dest Cond |
|---|---|---|---|---|---|
| 1A | 85 | 30 | 45 | Step to 85 MW | Step to FSNL |
| 1B | 85 | 86 | 54 | Step to 85 MW | Step to FSNL |
| 1C | 85 | 120 | 65 | Step to 85 MW | Step to FSNL |
| 2A | 180 | 30 | 97 | Step to 90 MW | Step to 90 MW |
| 2B | 180 | 86 | 116 | Step to 90 MW | Step to 90 MW |
| 2C | 180 | 120 | 140 | Step to 90 MW | Step to 90 MW |
| 3 | 140 | 86 | 90 | Step to 70 MW | Step to 70 MW |
| 4 | 32 | 86 | 20 | Step to 16 MW | Step to 16 MW |

In Table 2, cases 1A, 1B and 1C represent island load conditions at three ambient conditions in which one gas turbine generator (unit 1) provides power for the full power island load demand and second generator (Unit 2) is tripped offline to a full speed no load (FSNL) condition. Cases 2A, 2B and 2C represent island load conditions where the power island load demand is split amongst the two gas turbine generators (Units 1 and 2). These six cases (1A to 1C, and 2A to 2C) cover the load steps that will likely occur at a power plant and represent cases for controlling speed and combustor stability. Case 3 represents the lowest load that will cause the two gas turbine power generator units to stay on line using the island load split function illustrated in FIG. 6, which shows where each case falls with respect to the island load split function.

Case 4 represents a step to 10% of gas turbine load. This case is an important design condition for evaluating steam side performance. Gas turbine exhaust conditions are provided for all the cases.

Table 3 summarizes the speed response and blowout margin performance for all the cases presented. The speed response is seen to be well within the design range for all cases.

TABLE 3

Simulation Case Summary

| Case | Maximum Speed (%) | Minimum Speed (%) | Average PM1 Blowout Margin (%) | Minimum PM1 Blowout Margin (%) |
|---|---|---|---|---|
| Design Target | <108 | >98 | — | >20% |
| 1A | 103.51 | 99.96 | 26.9 | 18.2 |
| 1B | 102.49 | 99.97 | 29.7 | 24.5 |
| 1C | 101.64 | 99.87 | 29.1 | 23.5 |
| 2A | 103.65 | 99.74 | 27.5 | 20.5 |
| 2B | 102.49 | 99.89 | 30.2 | 23.8 |
| 2C | 101.46 | 99.87 | 29.3 | 23.5 |
| 3 | 103.18 | 99.91 | 26.9 | 20.7 |
| 4 | 105.17 | 99.18 | 54.6 | 47.6 |

Data was captured during each simulation case and several key machine parameters are displayed in the charts shown in FIGS. 10 to 32. The parameters included in the charts are defined in Table 4.

TABLE 4

Signal Descriptions

| Signal Name | Description | Type | Engineering Units |
|---|---|---|---|
| CSGV | Inlet Guide Vane Angle | Float | DGA |
| FSR | Fuel Stroke Reference | Float | % |
| DWATT | MWATT Output | Float | MWATT |
| DVAR | MVAR Output | Float | MVAR |
| EXHMASS | Exhaust Mass Flow | Float | LB/S |
| L52LX1 | Line Breaker Status | Bool | 0 = open<br>1 = closed |
| TNH | Turbine Speed | Float | % |
| TTXM | Exhaust Temperature | Float | DEG F |
| WPM1 | PM1 Nozzle Fuel Flow | Float | LB/S |
| WPM2 | PM1 Nozzle Fuel Flow | Float | LB/S |
| WPM3 | PM1 Nozzle Fuel Flow | Float | LB/S |

TABLE 4-continued

Signal Descriptions

| Signal Name | Description | Type | Engineering Units |
|---|---|---|---|
| WQUAT | Quaternary Fuel Flow | Float | LB/S |

Figure 10:
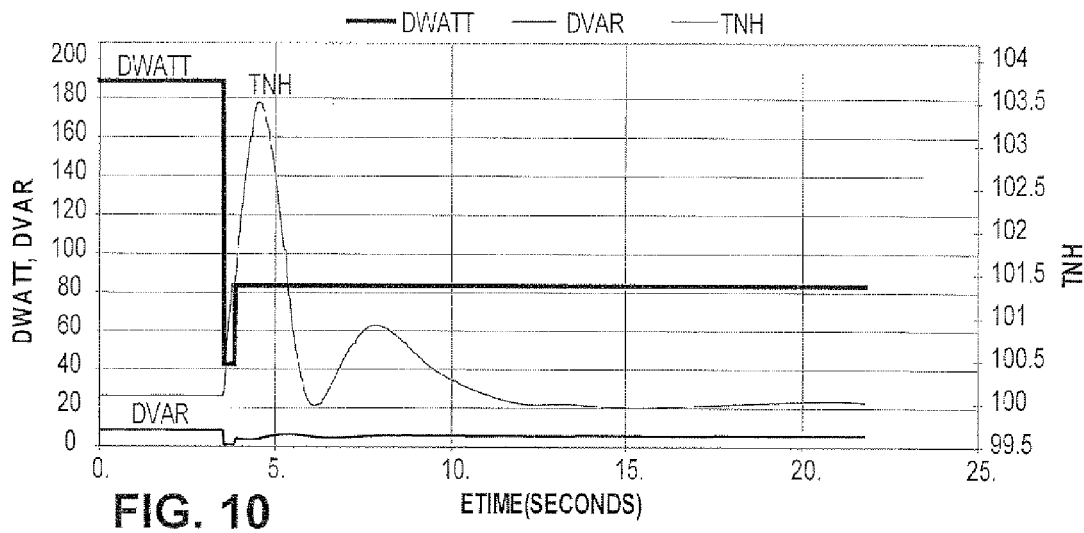
FIGS. 10 to 33 are charts showing simulated performance of a controller adapted to perform in the manner shown in FIG. 9 as a gas turbine transitions from a base load to an island mode.

Case 1A (FIGS. 10 to 12): The conditions are base load to 85 MW Island Load with ambient temperature at 30° F. Case 1A begins with both units at base load, e.g. base load for a grid. At 30° F., base load is about 185 MW. The target island load is preset to 85 MW. In FIG. 10, the load drops initially to 42.5 mw for about 0.3 seconds and then steps up to 85 MW. Because the island load split function (90 in FIG. 6) calls for the 85 MW load to be carried by one unit and so the second unit is tripped off line. Since there is a short delay before second unit trips off line, the 85 MW load is briefly shared by both units, each at 42.5 MW as expected.

At the load drop, speed (TNH) rises quickly to a maximum of 103.5% before decaying back toward 100%. The design target for maximum speed during island transients is 108%. For reference, a typical full load rejection will result in an over-speed of about 106% and the over-speed trip level is set at 110%. There is little under-speed seen during the case shown in FIG. 7. The design target for minimum speed during a step to island transients is 98%. The under frequency trip level is set at 94%.

In response to the speed and acceleration increase, the control system commands a substantial reduction in total fuel flow as indicated by FSR in the second chart. FSR drops from 80% to a minimum limit of about 24%. A second smaller speed transient occurs as FSR increases off of the minimum level at about 45%.

Figure 11:
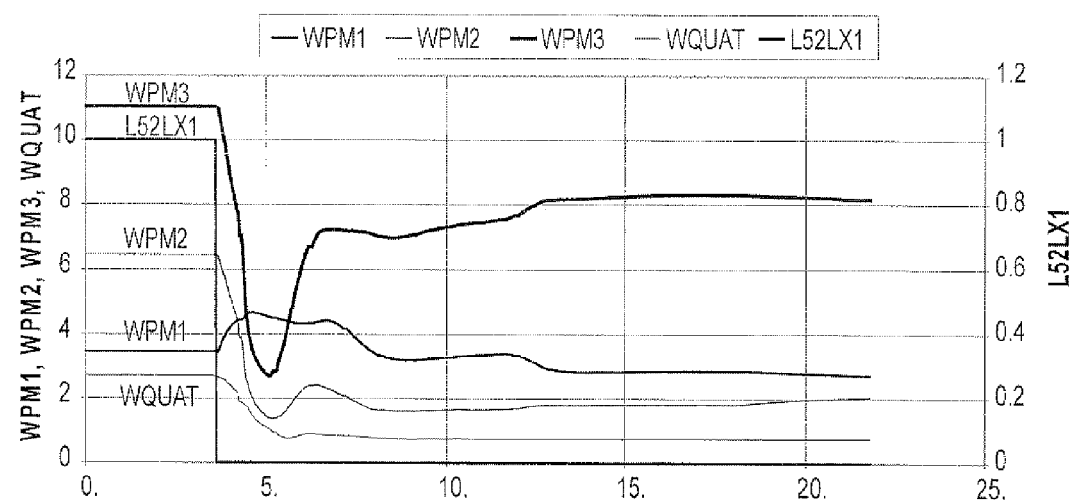

The function of the transient fuel control algorithm is illustrated in FIG. 11, which shows the fuel flows in the four gas fuel circuits. While the flow (W) to the PM2 and PM3 fuel nozzles and the Quaternary circuits are being drastically reduced, the flow (W) to the PM1 circuit is increased. The PM1 flow is adjusted through the transient to maintain an ultra-stable flame at the PM1 nozzle. As the transient progresses, the individual fuel flows are gradually returned to their normal steady operating levels. To assess if the combustor flame stability is adequate, the amount of combustor blowout margin as been calculated for each case. For case 1A, the average blowout margin during the transient is 26% and minimum blowout margin is 18%. For reference, the blowout margin for normal steady state operation in combustion mode 6 is about 7%. A substantial increase in blowout margin has been achieved during the step to island transient. The design target for minimum blowout margin is 20% and thus case 1A has slightly less blowout margin than desired. It is fully anticipated that with additional tuning of the in the transient fuel control algorithm, a minimum blowout margin of 20% will be achieved for all conditions.

Figure 12:
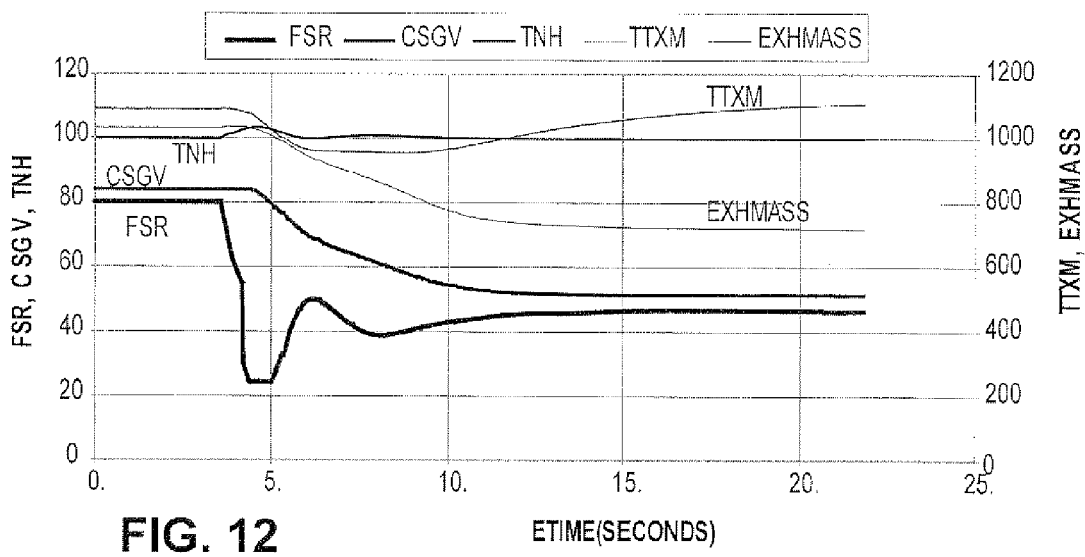

The gas turbine exhaust mass flow and temperature trends are shown in FIG. 12. The largest changes in machine conditions are seen to occur in the first 10-15 seconds of the transient.

Figure 13:
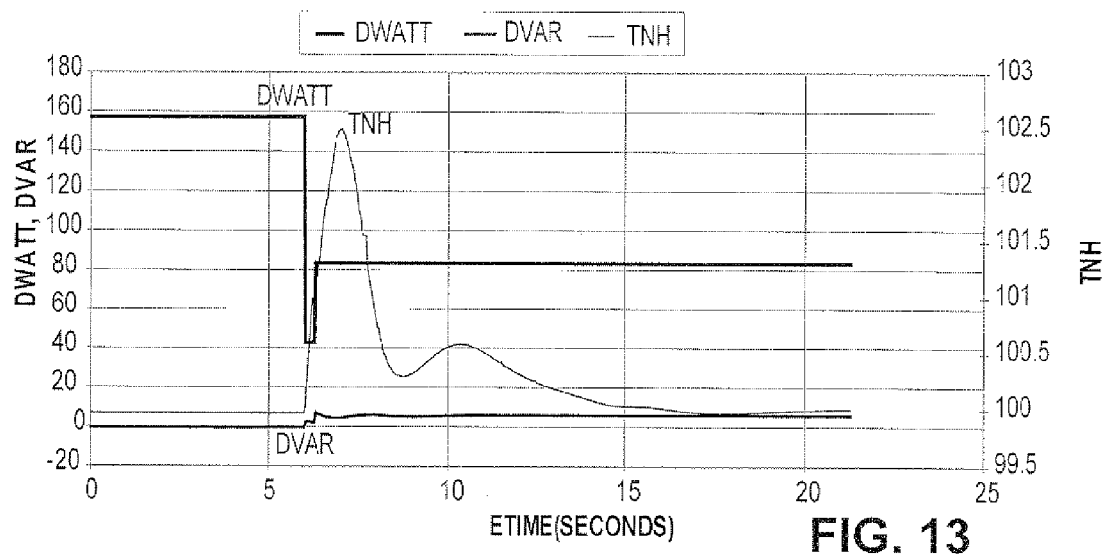
Figure 14:
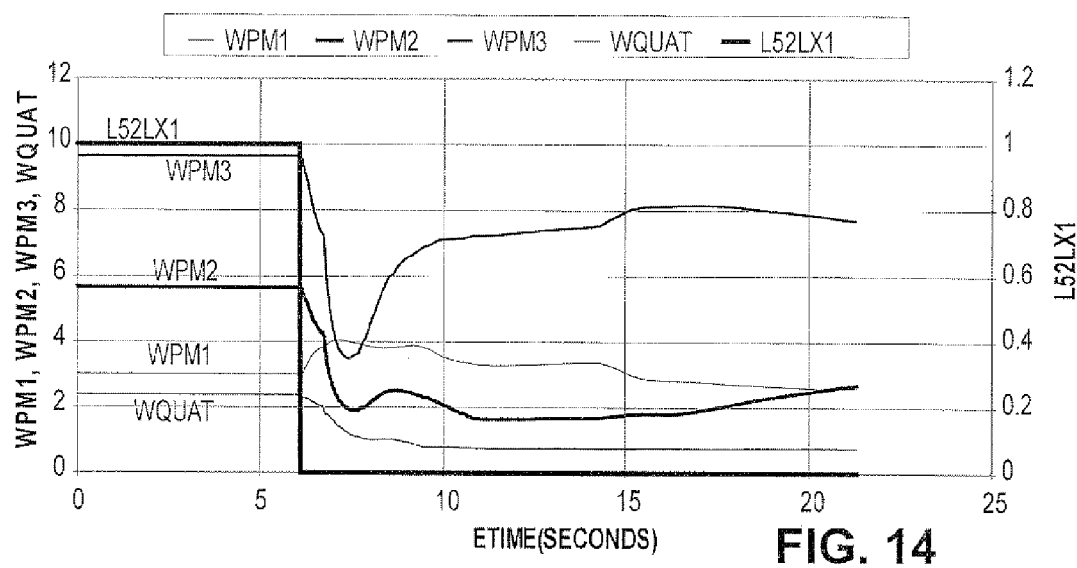
Figure 15:
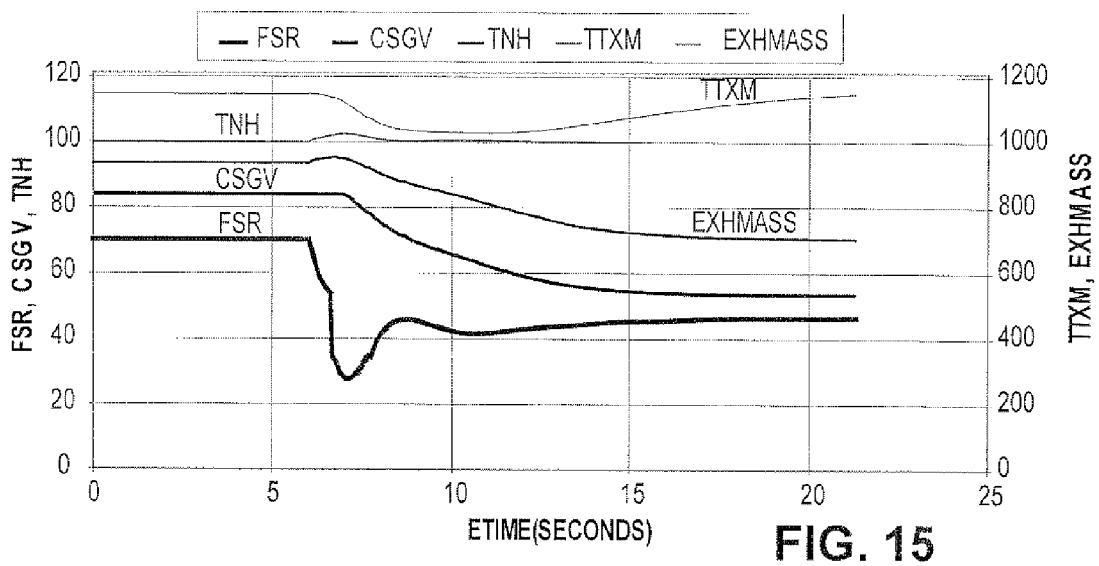
Figure 16:
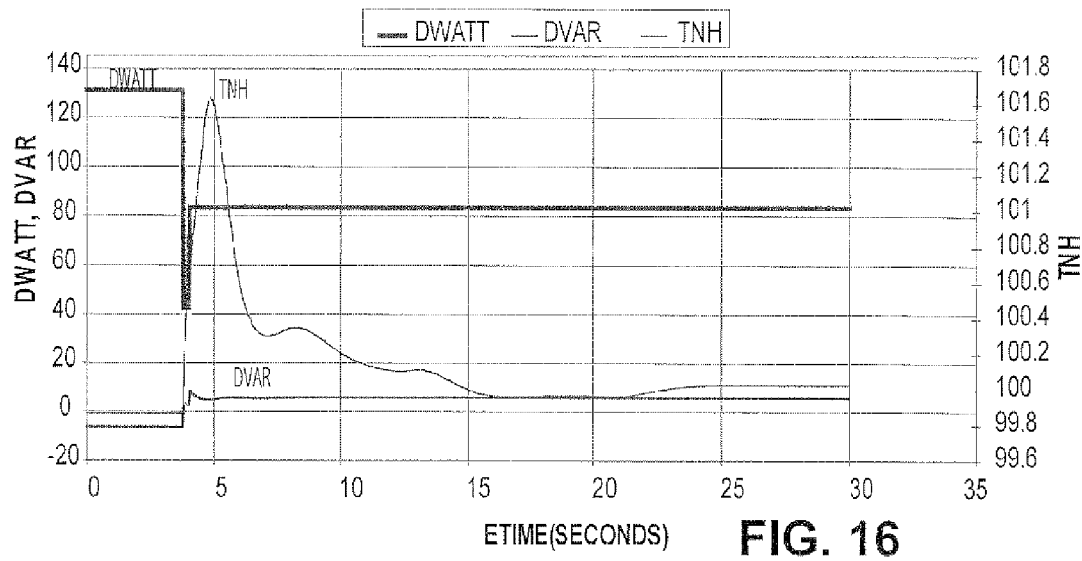
Figure 17:
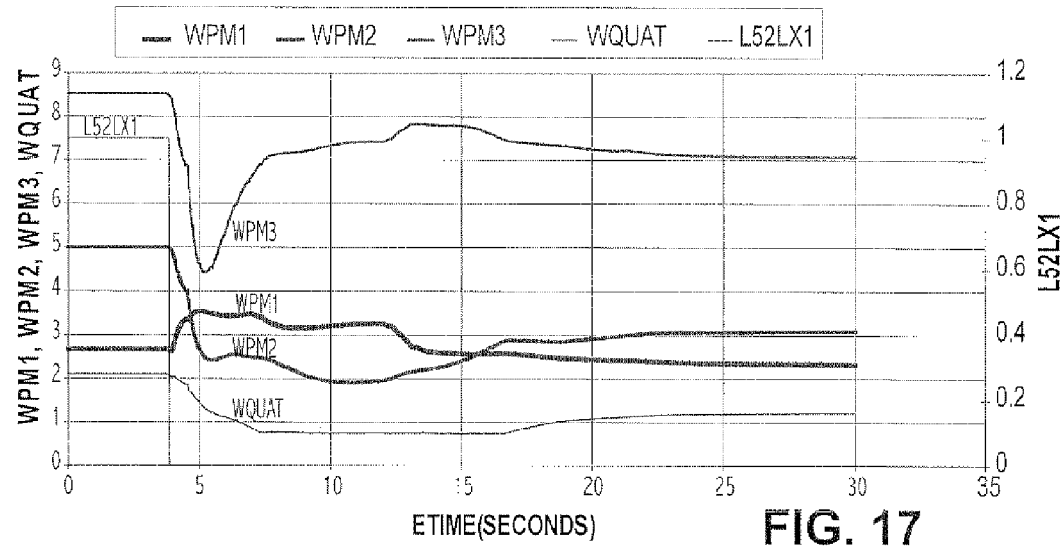
Figure 18:
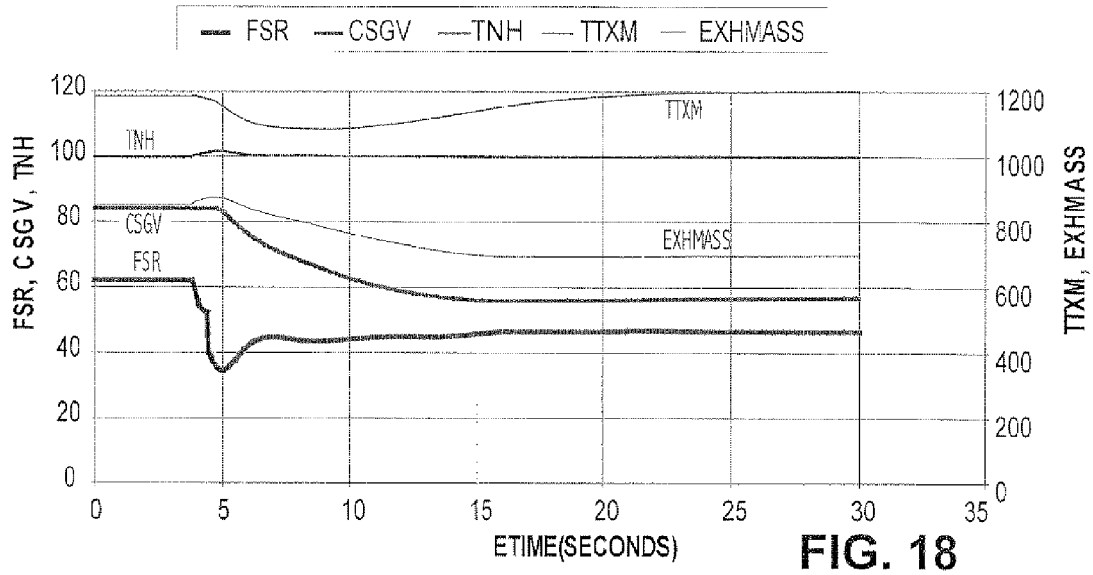
Figure 19:
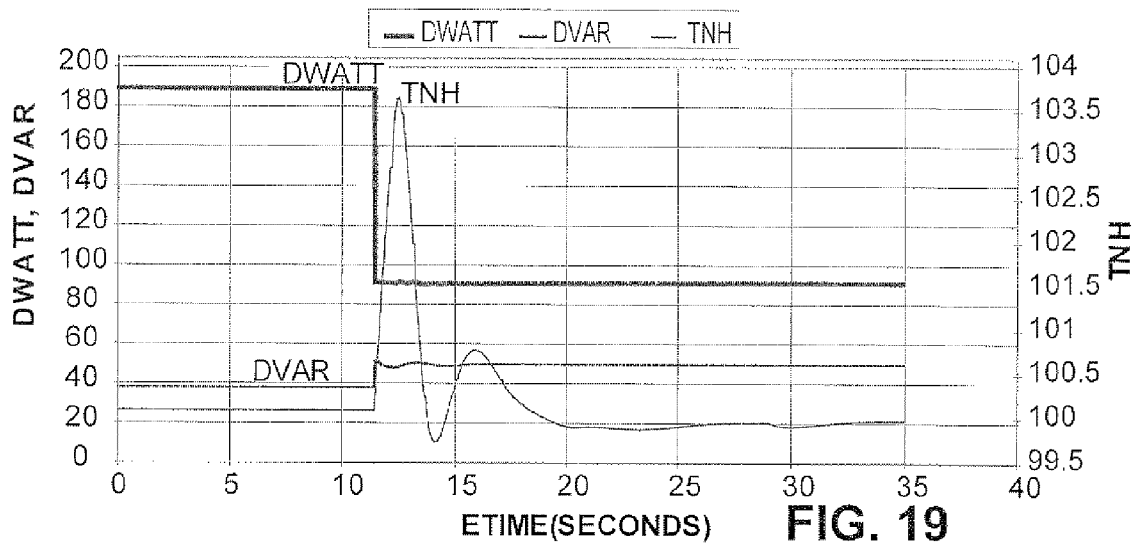
Figure 20:
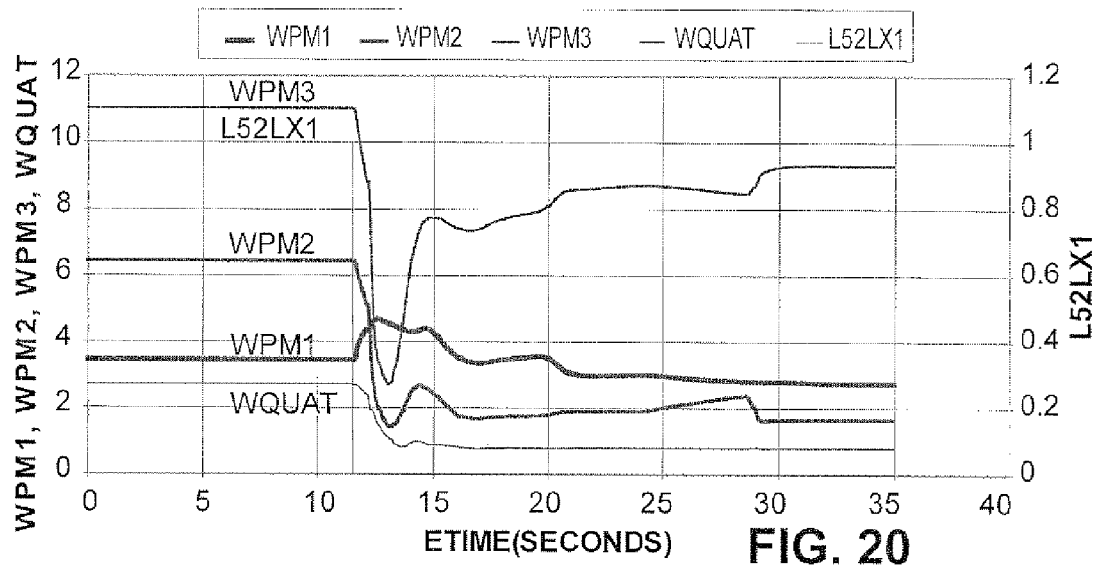
Figure 21:
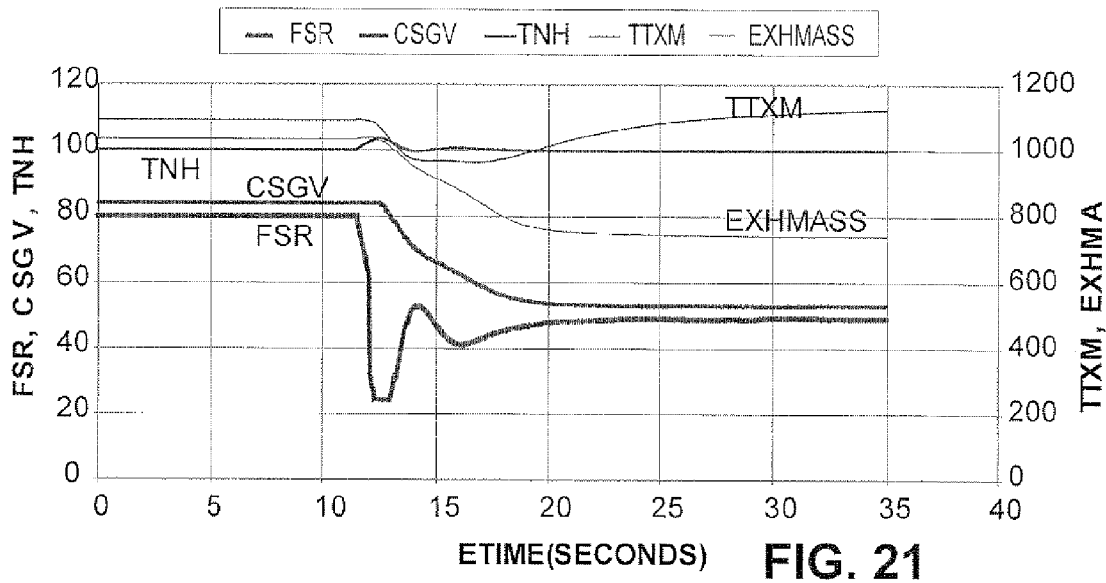
Figure 22:
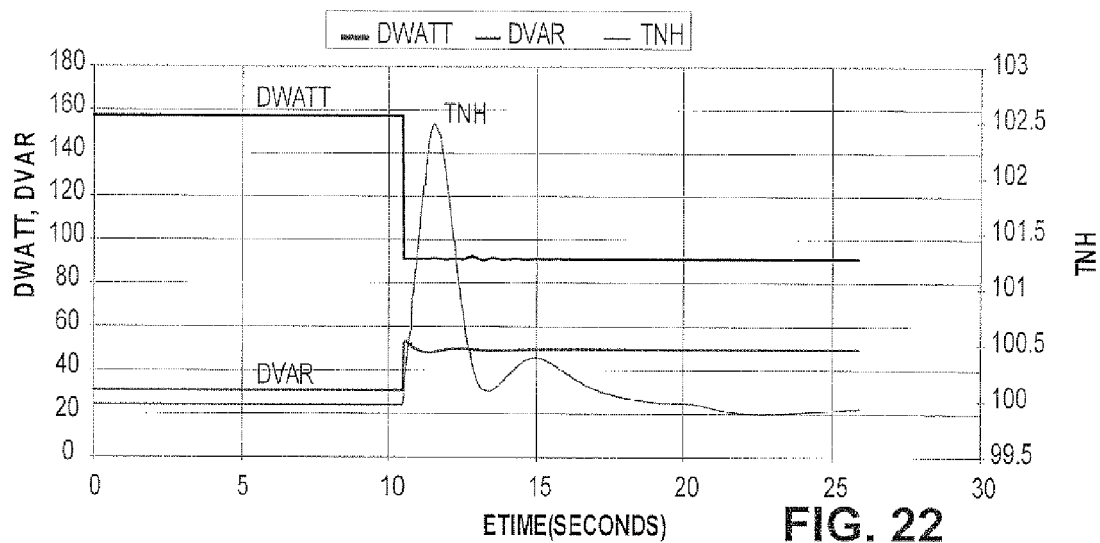
Figure 23:
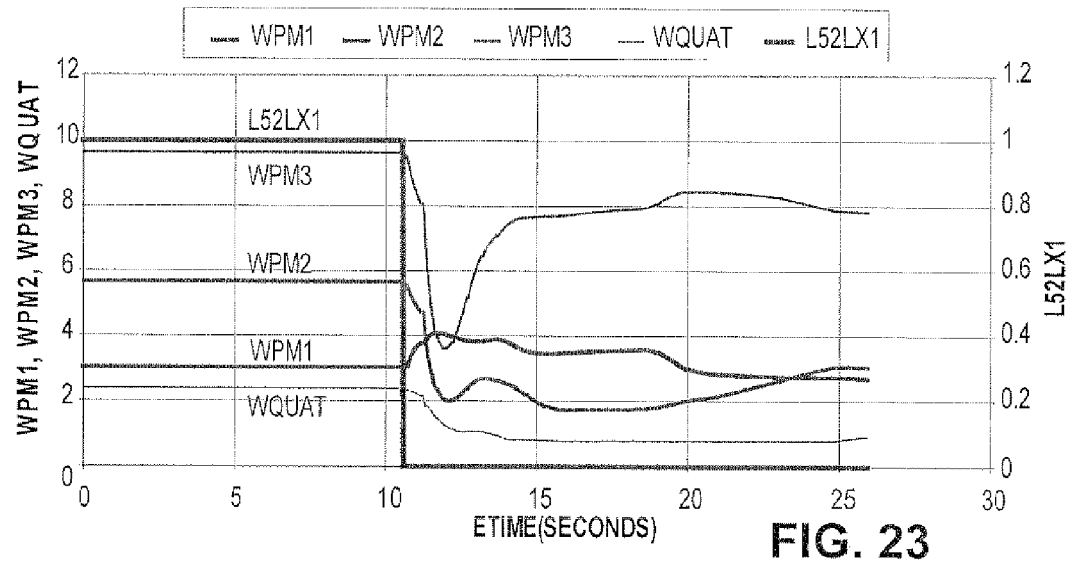
Figure 24:
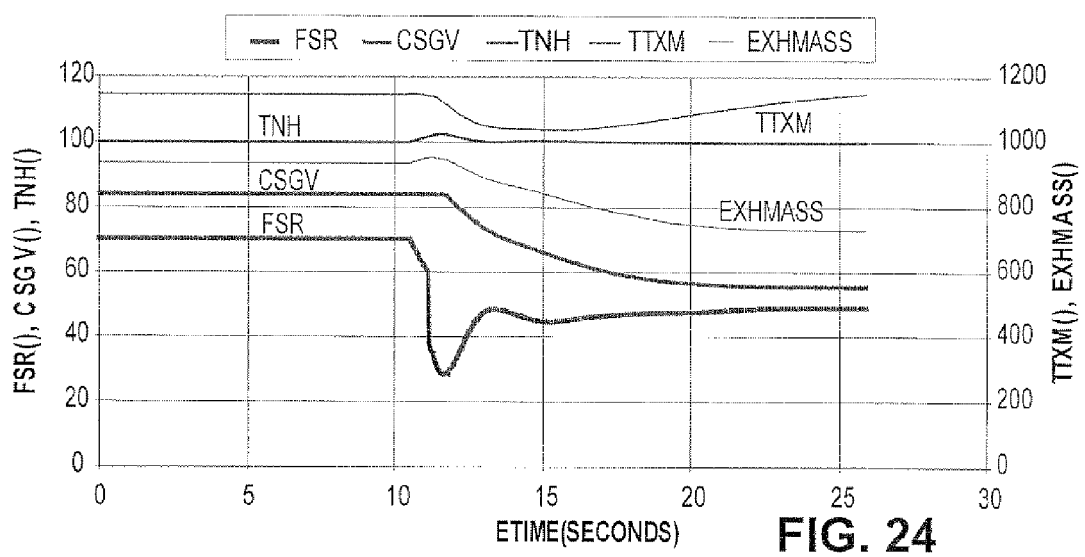
Figure 25:
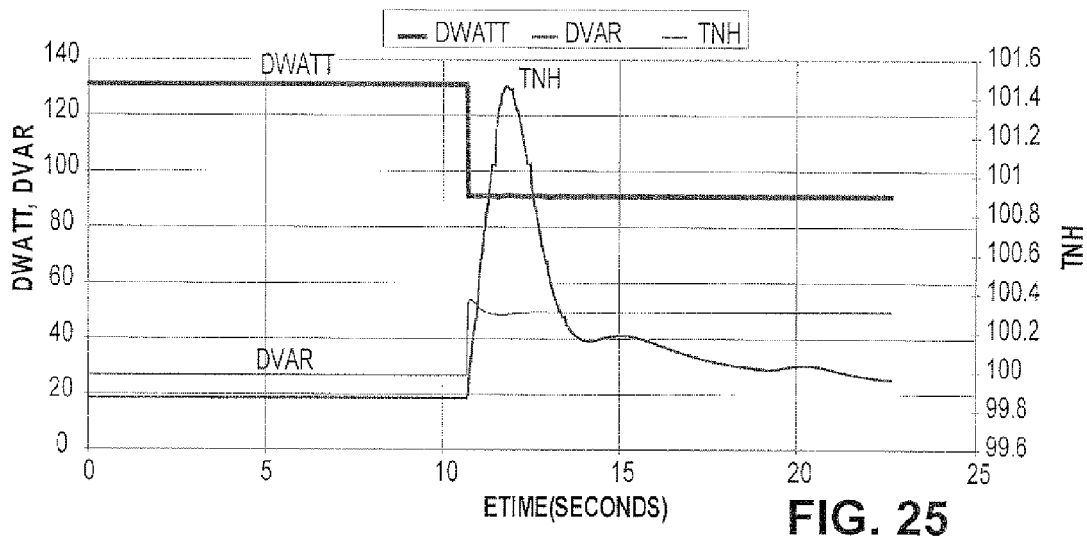
Figure 26:
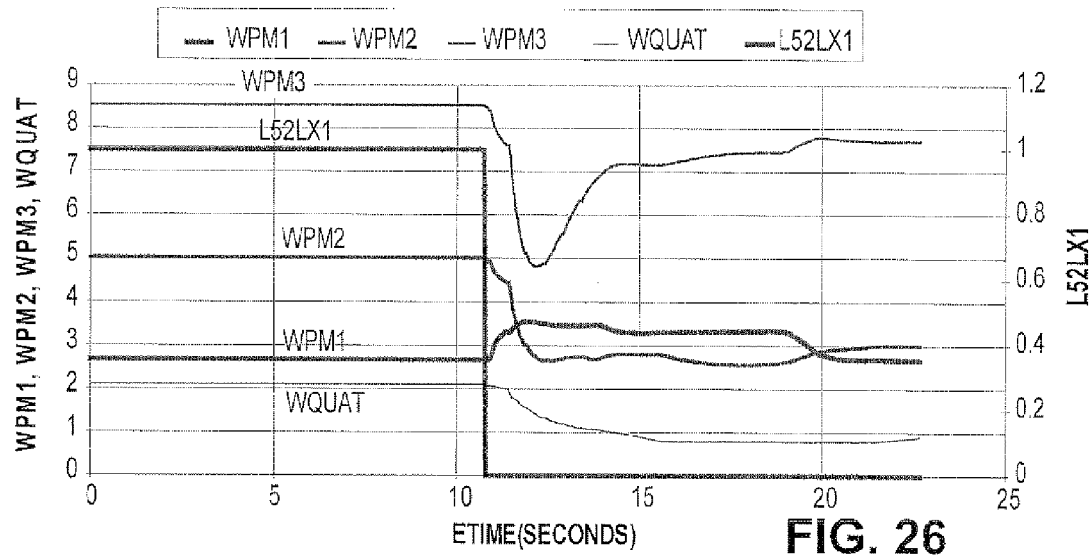
Figure 27:
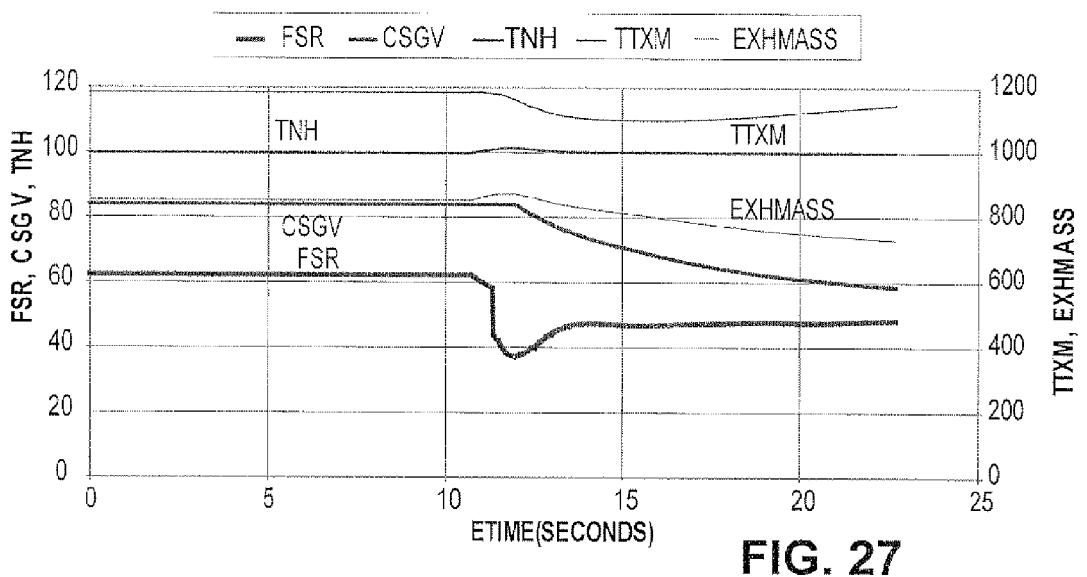
Figure 28:
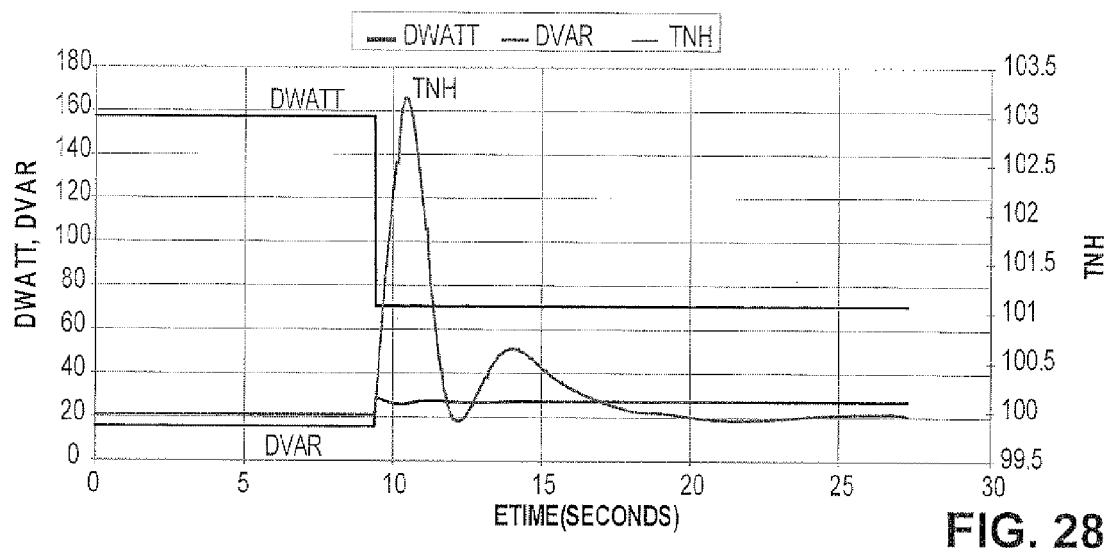
Figure 29:
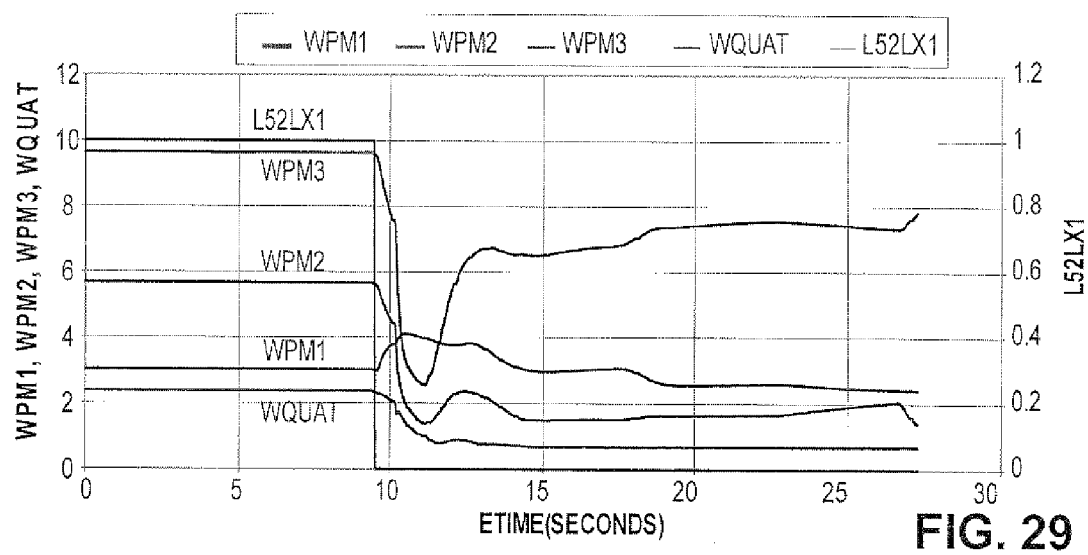
Figure 30:
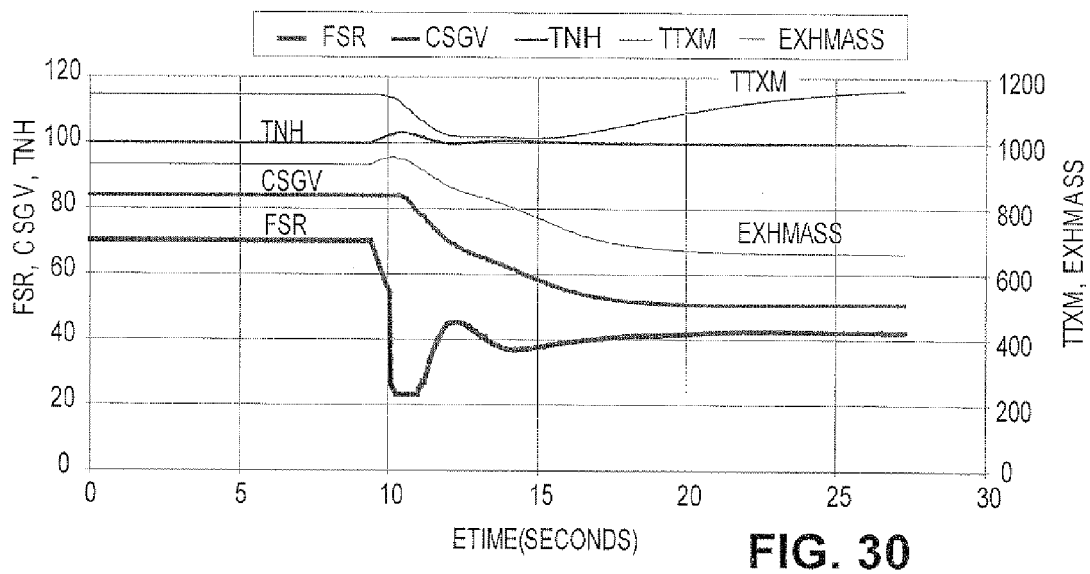
Figure 31:
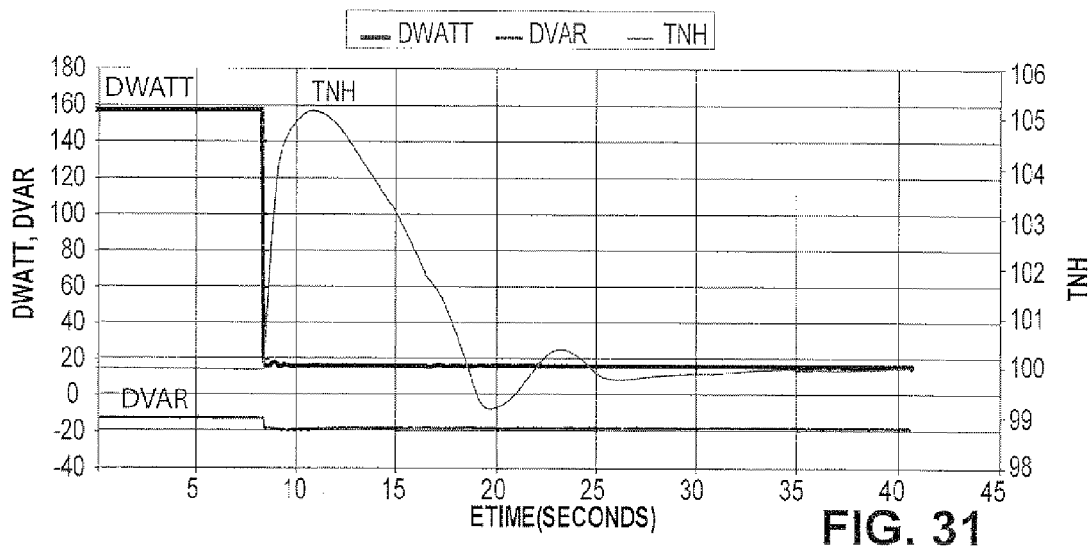
Figure 32:
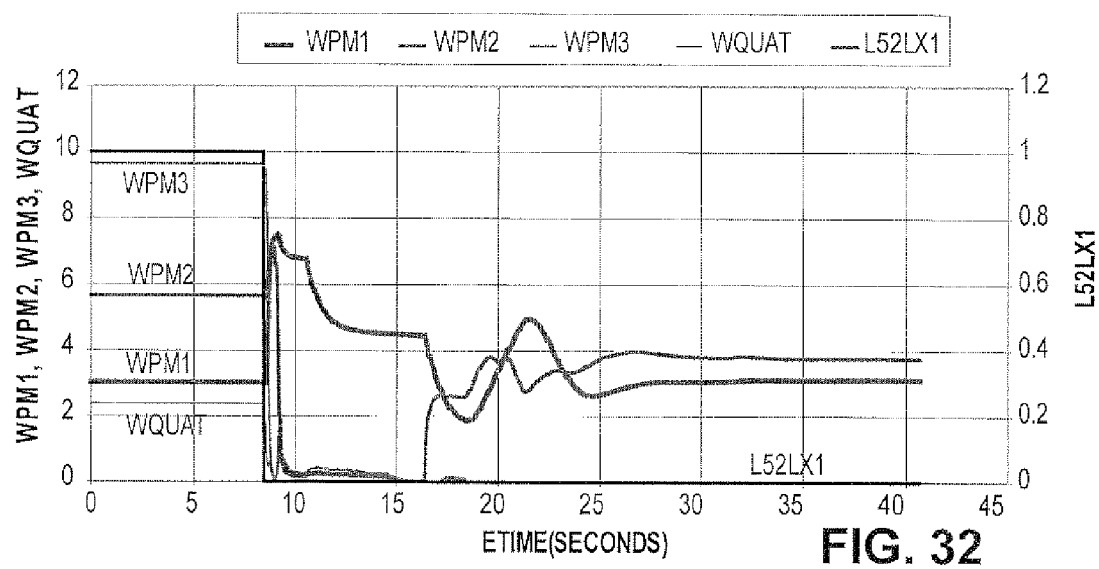
Figure 33:
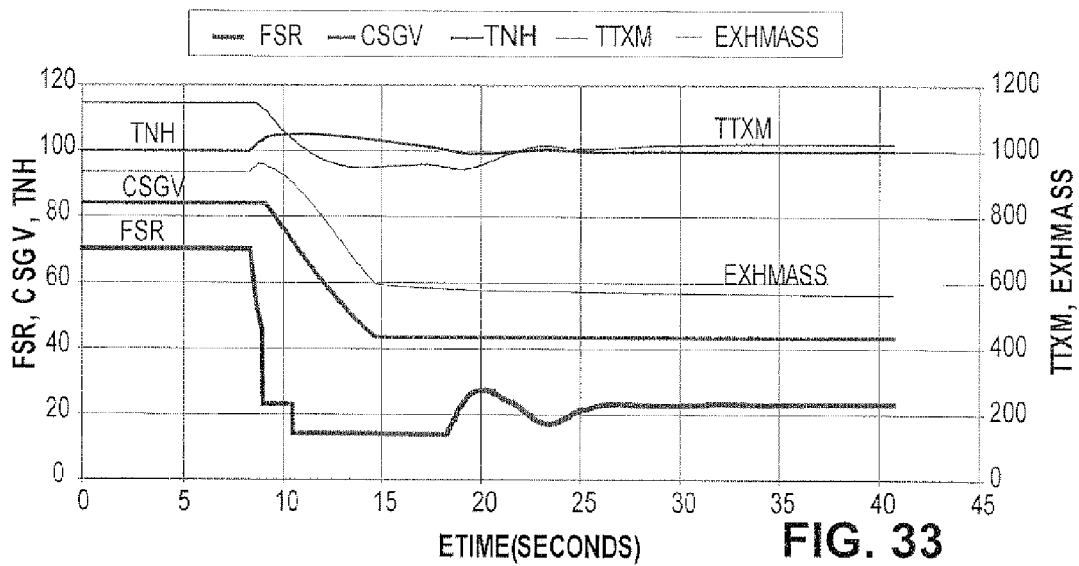

Case 1B (FIGS. 13 to 15): This simulation is for a transition from base to 85 MW Island Load, and ambient at 86° F. In case 1B the target island load is 85 MW and the ambient temperature 86° F. At 86° F., base load is about 155 MW and the load step change for case 1B is smaller than that for case 1A. In FIG. 13, the same initial step to 42.5 MW occurs as in case 1A due to the delay in the second unit tripping off line. The maximum speed for case 1B is 102.5% and there is almost no under-speed condition. The trends in speed and other turbine conditions (see FIG. 15) are similar to case 1A but of smaller magnitude. As a general rule, the smaller the load step, the smaller the excursions from nominal for most other turbine parameters. The average and minimum combustor blowout margins are 29% and 25%, respectively, which is adequately above the design target of 20%.

Case 1C (FIGS. 16 to 18): The simulation assumes a transition from a base load to 85 MW Island Load, at an ambient temperature of 120° F. In case 1C the target island load is 85 MW and the ambient temperature 120° F. At 120° F., the base load is about 130 MW such that the load step is smaller than for cases 1A and 1B. An initial step to 42.5 MW occurs (same as in case 1A and 1B) due to the delay in the second unit tripping off line. The maximum speed for case 1C is 101.6% and there is almost no under-speed. The trends in speed and other turbine parameters are similar to cases 1A and 1B but have smaller magnitude. The average and minimum combustor blowout margins are 29% and 24%, respectively.

Case 2A (FIGS. 19 to 21) is a simulation of a base load to 180 MW Island Load, at an ambient temperature of 30° F. Case 2A begins with both units at base load at an ambient of 30° F. The target island load is preset to a 180 MW load. The island load split function calls for the 180 MW load to be carried by both units, each operating at 90 MW. Both units remain on line and experience an identical transient from base load (approximately 185 MW) to 90 MW. The maximum speed in case 2A is 103.6% and the minimum speed, 99.7%. This is close to the speed trend for case 1A, in which only one unit was stepped from 188 to 85 MW and confirms the expectation that the two units will behave independently of one another if they experience the same load change. The trends in other turbine parameters are also similar to case 1A. The average and minimum combustor blowout margins for case 2A are 27% and 21%, respectively.

Case 2B (FIGS. 22 to 24) is a simulation of a base load to 180 MW island load, at an ambient temperature of 86° F. As for case 2A, both gas turbine units remain on-line in island mode and experience an identical transient from base load (approximately 155 MW) to 90 MW. The maximum speed in case 2B is 102.5% and the minimum speed is 99.9%. The trends in other turbine parameters are similar to case 2A, but smaller in magnitude. The average and minimum combustor blowout margins for case 2B are 30% and 24% respectively.

Case 2C (FIGS. 25 to 27) is a simulation of a base load to 180 MW island load, at an ambient temperature of 120° F. As for cases 2A and 2B, both gas turbine units remain on-line in island mode and experience an identical transient from base load (approximately 130 MW) to 90 MW. The maximum speed in case 2C is 101.5% and the minimum speed is 99.9%. The trends in other turbine parameters are similar to cases 1A and 1B, but smaller in magnitude. The average and minimum combustor blowout margins for case 2C are 29% and 23% respectively.

Case 3 (FIGS. 28 to 30) is a simulation of a transition from base load to 140 MW Island Load, at an ambient temperature of 86° F. In case 3, the target island load is 140 MW and the ambient temperature 86F. A load of 140 MW is close to the lowest load for which the island load split function will use two units to support the load. Both units remain on line and experience an identical transient from base load (157 MW) to 70 MW. The maximum speed in case 3 is 103.2% and the minimum speed, 99.9%. The trends in other turbine parameters are similar to all prior cases. The average and minimum combustor blowout margins for case 3 are 27 and 21%, respectively.

Case 4 (FIGS. 31 to 33) is a simulation of a transition from base load to 32 MW Island Load, at an ambient temperature of 86° F. Case 4 includes an intermediate step to an island load of just 16 MW at an ambient of 86 F. The load split function will support this load with one unit, the second unit tripping to FSNL. Furthermore, the load is low enough that the standard islanding function is used.

The load step in case 4 (approximately 155 to 16 MW), is larger than any of the other cases and as expected the speed excursion is larger. The maximum speed in case 4 is 105.2% and the minimum speed, 99.2%. The trends in other turbine parameters are somewhat different than the other cases. The fuel system response is expectedly different as standard island function employs a unique mode and fueling strategy. The average and minimum combustor blowout margins for case 4 are 55 and 47%, respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for transient fuel control for fuel delivery circuits for a plurality of connected gas turbines including a first gas turbine, said method comprises:
   detecting a transient grid event based on an indication of at least one of a rapid change in a fuel command to the first gas turbine and an acceleration of a turbine shaft of the first gas turbine;
   upon detection of the transient grid event, commanding a gas turbine controller to transfer at least one of the connected gas turbines to at least one intermediate load;
   adjusting a combustor fuel split to maintain combustor stability in the at least one of the connected gas turbines during the transient grid event, and
   using a predetermined island load demand signal to apportion an island load demand among the connected gas turbine generators.

2. The method as in claim 1 wherein the at least one of the gas turbines is the first gas turbine.

3. The method as in claim 1 wherein the adjustment to the fuel split is an incresae to one of the fuel circuits in the at least one of the connected gas turbines.

4. The method as in claim 1 further comprising using the apportioned load demand to select a destination DLN combustion mode throughout the transientgrid event.

5. The method as in claim 1 wherein detecting the transient grid event includes remote detection of a speed condition of the first gas turbine.

6. The method as in claim 1 wherein apportioning includes applying no load to the at least one of the connected gas turbines.

7. The method as in claim 1 wherein apportioning includes sharing the island load demand between a plurality of the connected gas turbines.

8. The method as in claim 1 wherein detecting the transient grid event includes sensing tie line breaker changes.

9. The method as in claim 1 wherein the transient grid event includes maintaining a connection between a power grid and one or more generators each driven by at least one of the plurality of connected gas turbines.

10. A method for transient fuel control for fuel delivery circuits for a plurality of connected gas turbines including a first gas turbine, said method comprises:
    detecting a transient grid event based on an indication of at least one of a rapid change in a fuel command to the first gas turbine or an acceleration of turbine shaft of the first gas turbine, as a result of the transient grid event;
    upon detection of the transient grid event, commanding a gas turbine controller to transfer at least one of the gas turbines to at least one intermediate load;
    adjusting a combustor fuel split for the at least one of the gas turbines to maintain combustor stability during the transient grid event, and
    using a predetermined island load demand signal to apportion an island load demand among the connected gas turbine generators.

11. The method as in claim 10 wherein the at least one of the gas turbines in the first gas turbine.

12. The method as in claim 10 further comprising reducing a fuel reference signal after detection of the transient grid event.

13. The method as in claim 10 further comprising adjusting inlet guide vanes on the at least one of the gas turbines in response to the acceleration of the turbine shaft.

14. The method as in claim 10 further comprising setting a speed/load reference for the at least one of the gas turbines to transition to island mode.

15. The method as in claim 10 further comprising rejecting an excessive load demand by switching the at least one of the gas turbines to a no load condition.

16. A fuel control system for fuel delivery circuits for a plurality of connected gas turbines, said system comprises:
    the gas turbines each including a combustor and a controller;
    a detector monitoring a condition of a power grid and sensing a transient grid event;
    said controller executing a transient fuel control algorithm upon receiving a signal from the detector indicating the transient grid event, wherein said algorithm performs the following steps: generates a control signal to transfer at least one of the gas turbines to an intermediate load; adjusts a combustor fuel split to maintain combustor stability during the transient grid event, and apportions an island load demand among the connected gas turbine generators based on a predetermined island load demand signal.

17. The system as in claim 16 wherein the algorithm reduces a fuel reference signal after detection of the transient grid event.

18. The system as in claim 16 further comprising inlet guide vanes on the gas turbines which are adjusted in response to the acceleration of the gas turbine.

19. The system as in claim 16 wherein the algorithm further sets a speed set point for the gas turbine to transition to an island mode.

20. The system as in claim 16 further comprising tie breaker lines between the gas turbines and a power grid and an island load.

21. The system as in claim 20 wherein the island load is a plant load local to the gas turbines.

22. The system as in claim 16 further comprising a sensor detecting a dynamic condition of the gas turbine to detect the transient grid event.

* * * * *